(12) United States Patent
Lv et al.

(10) Patent No.: US 9,992,089 B2
(45) Date of Patent: Jun. 5, 2018

(54) PARAMETER OBTAINING METHOD AND APPARATUS

(71) Applicant: HUAWEI TECHNOLOGIES CO., LTD., Shenzhen (CN)

(72) Inventors: Jie Lv, Wuhan (CN); Xiaolong Zhang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/355,203

(22) Filed: Nov. 18, 2016

(65) Prior Publication Data
US 2017/0070409 A1 Mar. 9, 2017

Related U.S. Application Data

(63) Continuation of application No. PCT/CN2014/077893, filed on May 20, 2014.

(51) Int. Cl.
*H04B 3/00* (2006.01)
*H04B 3/46* (2015.01)
(Continued)

(52) U.S. Cl.
CPC .......... *H04L 43/0847* (2013.01); *H04B 3/00* (2013.01); *H04B 3/46* (2013.01); *H04B 10/0793* (2013.01);
(Continued)

(58) Field of Classification Search
CPC combination set(s) only.
See application file for complete search history.

(56) References Cited

U.S. PATENT DOCUMENTS

| 6,215,818 B1 | 4/2001 | Velez et al. |
| 7,142,609 B2 | 11/2006 | Terreault et al. |

(Continued)

FOREIGN PATENT DOCUMENTS

| CN | 101162970 | 4/2008 |
| CN | 101373989 | 2/2009 |

(Continued)

OTHER PUBLICATIONS

International Search Report dated Mar. 4, 2015 in corresponding International Application No. PCT/CN2014/077893.
(Continued)

*Primary Examiner* — David Payne
*Assistant Examiner* — Omar S Ismail
(74) *Attorney, Agent, or Firm* — Staas & Halsey LLP

(57) ABSTRACT

The present invention discloses a parameter obtaining method and apparatus. In this method, multiple signals are received over a communications link on a network, where each of the received signals is corresponding to a point on a complex plane; decision is performed on each of the received signals; for each of the received signals, an error signal between the received signal and a corresponding decision signal is determined; and a complex-plane distribution feature parameter used to indicate a distribution feature, on the complex plane, of the signals received over the communications link is determined according to all the determined error signals. In this method, an inaccurate maintenance result in manual analysis of a constellation diagram is avoided.

12 Claims, 10 Drawing Sheets

(51) Int. Cl.
*H04B 17/391* (2015.01)
*H04L 12/26* (2006.01)
*H04B 10/079* (2013.01)
*H04L 1/00* (2006.01)
*H04L 1/20* (2006.01)
*H04Q 11/00* (2006.01)

(52) U.S. Cl.
CPC ......... *H04B 17/391* (2015.01); *H04L 1/0036* (2013.01); *H04L 1/203* (2013.01); *H04L 1/206* (2013.01); *H04Q 11/0066* (2013.01); *H04Q 2011/0083* (2013.01)

(56) References Cited

U.S. PATENT DOCUMENTS

| | | | |
|---|---|---|---|
| 2004/0073664 A1 | 4/2004 | Bestermann | |
| 2007/0223512 A1* | 9/2007 | Cooper | H04L 1/206 370/437 |
| 2010/0157824 A1* | 6/2010 | Thompson | H04L 43/0823 370/252 |
| 2013/0128938 A1* | 5/2013 | Yanagisawa | H04B 3/46 375/224 |
| 2013/0223550 A1* | 8/2013 | Fimoff | H04L 1/0045 375/261 |
| 2013/0223850 A1 | 8/2013 | Karout et al. | |
| 2014/0133534 A1 | 5/2014 | Shi | |

FOREIGN PATENT DOCUMENTS

| | | |
|---|---|---|
| CN | 102318302 | 1/2012 |
| EP | 1968270 | 9/2008 |

OTHER PUBLICATIONS

International Search Report dated Mar. 4, 2015 in corresponding International Patent Application No. PCT/CN2014/077893.
Chinese Office Action dated Dec. 5, 2016 in corresponding Chinese Patent Application No. 201480008237.2.
Extended European Search Report dated Feb. 27, 2017 in corresponding European Patent Application No. 14892453.3.
"Data Over Cable Service Interface Specifications DOCSIS 3.0, Physical Layer Specification, CM-SP-PHYv3.0-I11-130808" Cable Television Laboratories, Aug. 8, 2013.
"Data Over Cable Service Interface Specifications DOCSIS 3.1, Physical Layer Specification, CM-SP-PHYv3.1-I01-131029" Cable Television Laboratories, Oct. 29, 2013.

* cited by examiner

PARAMETER OBTAINING METHOD AND APPARATUS

CROSS-REFERENCE TO RELATED APPLICATIONS

This application is a continuation of International Application No. PCT/CN2014/077893, filed on May 20, 2014, the disclosure of which is hereby incorporated by reference in its entirety.

TECHNICAL FIELD

The present invention relates to the field of communications technologies, and in particular, to a parameter obtaining method and apparatus.

BACKGROUND

A hybrid fiber coaxial (HFC) technology is an integrated digital service broadband network access technology. An access network using the HFC technology generally includes three parts: a fiber trunk, a coaxial cable branch, and a user distribution cable. A program signal from a cable television broadcast station is first converted into an optical signal for transmission on the fiber trunk. The optical signal is converted into an electrical signal after arriving in a user area. After being distributed by using a distributor, the electrical signal is sent to a user by using the coaxial cable branch and the user distribution cable.

As shown in FIG. 1, according to a recording of a specification CM-SP-OSSI disclosed by a Cable Television standard organization, Cable Labs, a network that complies with a Data Over Cable Service Interface Specification (DOCSIS) falls into the following types: a backend office network, an HFC network, and a home network. The backend office network is connected to the HFC network by using a cable modem termination system (CMTS), and the backend office network includes a network management system (NMS) and a provisioning server. On a central office side, the HFC network is connected to the backend office network by using the CMTS; on a user side, the HFC is connected to customer-premises equipment (CPE) by using a cable modem (CM), where the CPE may fall into the following types according to a supported Internet Protocol version: CPE supporting an IPv4 and CPE supporting an IPv6.

A typical HFC network generally includes various devices (such as a CMTS, a CM, and an optical node), components (such as an amplifier, an attenuator, a splitter, and a distributor), and lines (such as an optical cable and a cable). A fault may occur on each device, or each component, or each segment of the cable or the optical cable.

During network operation maintenance (Network Maintenance), an operating situation of a network can be known by monitoring a signal (such as parameters of a network and a device) on the network, and when a fault occurs on the network, fault locating and fault clearing are performed. Conventional network maintenance is triggered by a complaint from the user and is passive. With development of technologies, a proactive network maintenance (PNM) technology has developed. When the PNM technology is applied to the HFC network, by analyzing parameters of the HFC network and a device, an operating situation of the HFC network is known in real time, a problem is found and located in advance, and a fault is handled before the user makes a complaint.

Generally, a location of a PNM server on the HFC network is shown in FIG. 2. The PNM server collects operating parameters of the CMTS and the CM from a local area network or a wide area network, and then performs network maintenance according to the operating parameters.

A solution of performing HFC network maintenance according to the operating parameters is as follows: manually analyzing a constellation diagram of signals received over a communications link on the HFC network (a test instrument is generally connected to a particular part of the HFC network to measure and display the constellation diagram), and monitoring a fault (for example, at a particular point of the communications link on the HFC network, a signal is received by using the test instrument, and the received signal is measured to display the constellation diagram). The following briefly describes principles of performing HFC network maintenance by manually analyzing the constellation diagram to know the operating situation of the network and monitor the fault.

In-phase quadrature (IQ) modulation is also referred to as quadrature amplitude modulation (QAM). In a digital communications system, two orthogonal signals are generally used for modulation, and a real part and an imaginary part of a signal are respectively correspondingly modulated to two orthogonal signals I and Q. A modulated or demodulated digital signal can be indicated by using a complex number (I, Q) constellation point. If the complex number is drawn onto a complex plane, the complex number is corresponding to a point on the complex plane, and therefore the complex number becomes a constellation point. By drawing multiple constellation points onto the complex plane, a constellation diagram is formed. Both a PNM system and a conventional test instrument can provide function maintenance for the constellation diagram.

The constellation diagram has different features. There are N quadrate grids in the constellation diagram, and N is corresponding to a QAM order; for example, for 64-QAM, there are 64 grids on the complex plane. In a normal constellation diagram, constellation points are all distributed in the centers of grids, as shown in FIG. 3.

Different faulty constellation diagrams have different features. The following are some common faulty constellation diagrams.

1. When a phase error occurs, constellation points rotate (as shown in FIG. 4).
2. When a gain compression error occurs, peripheral constellation points deviate towards the center (as shown in FIG. 5).

In addition, other faults also have different features; for example, a constellation diagram is in a rectangular shape, in a rhombic shape, or the like.

The foregoing solution of manually analyzing a received-signal constellation diagram to know an operating situation of a network and detect a network fault has the following disadvantages:

1. A constellation diagram observation method is applicable only to a modulation scheme with a small QAM order. It is generally considered that the constellation diagram cannot be used when a QAM order is greater than 4096, because neither observation nor analysis can be performed when many grids are displayed in one diagram. A conventional HFC network does not use high-order modulation (256 QAM to a maximum extent, that is, there are a maximum of 256 grids in the constellation diagram), and therefore a method for manually analyzing a constellation diagram for fault determining is still applicable. However, on a next-generation HFC network, a modulation order is greatly increased (set to up to 16384 QAM), and such a high order is far beyond an applicable scope of manual analysis of the constellation diagram. Currently, there is not an effective method that can be used to perform fault analysis on a constellation diagram with such a high QAM order.

Currently, the DOCSIS supports 16384 QAM to a maximum extent, and such a high order is far beyond an applicable scope of the constellation diagram.

2. The constellation diagram needs to be analyzed by an engineer having some technical knowledge. For manual analysis of the constellation diagram, there is a problem that an analysis result depends on the engineer's technical level and the result may be inaccurate.

In conclusion, the solution of performing network maintenance by manually analyzing the received-signal constellation diagram is not applicable to a higher-order QAM scheme, and an analysis result depends on an technical level.

SUMMARY

Embodiments of the present invention provide a parameter obtaining method and apparatus, so as to resolve a problem that manual analysis of a received-signal constellation diagram for network maintenance is not applicable to a higher-order QAM scheme, and an analysis result depends on an technical level.

According to a first aspect, an embodiment of the present invention provides a parameter obtaining method, including:

receiving multiple signals over a communications link on a network, where each of the received signals is corresponding to a point on a complex plane;

performing decision on each of the received signals, so as to obtain a decision signal;

determining, for each of the received signals, an error signal between the received signal and a corresponding decision signal; and determining, according to all the determined error signals, a complex-plane distribution feature parameter used to indicate a distribution feature, on the complex plane, of the signals received over the communications link.

With reference to the first aspect, in a first possible implementation manner, the determining a complex-plane distribution feature parameter includes:

collecting statistics about amplitudes, real parts, or imaginary parts of all the error signals, so as to generate a first statistical value; and using the generated first statistical value as the complex-plane distribution feature parameter.

With reference to the first aspect, in a second possible implementation manner, the determining a complex-plane distribution feature parameter includes:

determining a second statistical value used to indicate a relationship between all the error signals and their respective received signals, and using the second statistical value as the complex-plane distribution feature parameter; or determining a third statistical value used to indicate a relationship between all the error signals and their respective decision signals, and using the third statistical value as the complex-plane distribution feature parameter.

According to the parameter obtaining method provided in the first aspect of the present invention, a complex-plane distribution feature parameter used to indicate a distribution feature, on a complex plane, of signals received over a communications link is determined according to error signals between the signals received over the communications link and decision signals, thereby avoiding an inaccurate maintenance result in manual analysis of a constellation diagram. Because automatic parameter obtaining is used, efficiency is greatly improved compared with a method for manually analyzing a constellation diagram. In addition, there is no modulation order restriction because the foregoing complex-plane distribution feature parameter is obtained by using the error signals.

According to a second aspect, an embodiment of the present invention provides a parameter obtaining apparatus, including:

a first processing module, configured to: receive multiple signals over a communications link on a network, where each of the received signals is corresponding to a point on a complex plane; perform decision on each of the received signals, so as to obtain a decision signal; and determine, for each of the received signals, an error signal between the received signal and a corresponding decision signal; and a second processing module, configured to determine, according to all the error signals determined by the first processing module, a complex-plane distribution feature parameter used to indicate a distribution feature, on the complex plane, of the signals received over the communications link.

According to the parameter obtaining apparatus provided in the second aspect of the present invention, a complex-plane distribution feature parameter used to indicate a distribution feature, on a complex plane, of signals received over a communications link is determined according to error signals between the signals received over the communications link and decision signals, thereby avoiding an inaccurate maintenance result in manual analysis of a constellation diagram. Because the parameter obtaining apparatus automatically obtains the complex-plane distribution feature parameter, efficiency is greatly improved compared with a method for manually analyzing a constellation diagram. In addition, there is no modulation order restriction because the foregoing complex-plane distribution feature parameter is obtained by using the error signals.

According to a third aspect, an embodiment of the present invention provides a network maintenance method, including:

obtaining a complex-plane distribution feature parameter that indicates a distribution feature, on a complex plane, of signals received over a communications link on a network; and performing maintenance on the communications link according to the obtained complex-plane distribution feature parameter; where the complex-plane distribution feature parameter is determined according to error signals between multiple signals received over the communications link and decision signals corresponding to all the received signals, and each of the received signal is corresponding to a point on the complex plane.

With reference to the third aspect, in a first possible implementation manner of the third aspect, the complex-plane distribution feature parameter includes:

a first statistical value obtained by collecting statistics about amplitudes, real parts, or imaginary parts of all the error signals.

With reference to the first possible implementation manner of the third aspect, in a second possible implementation manner, the first statistical value is:

a modulo of an average error signal obtained by averaging all the error signals, or an absolute value of a real part or an imaginary part of an average error signal; and the performing maintenance on the communications link includes:

when one or more of the following conditions are met, determining that carrier signals I and Q of a modulation or demodulation device on the communications link are coupled to a line:

the modulo of the average error signal is greater than a modulo threshold of the average error signal;

the absolute value of the real part of the average error signal is greater than an absolute-value threshold of the real part of the average error signal; or the absolute value of the imaginary part of the average error signal is greater than an absolute-value threshold of the imaginary part of the average error signal.

With reference to the first possible implementation manner of the third aspect, in a third possible implementation manner, the first statistical value is:

a ratio of a quantity of error signals whose amplitudes are less than an error amplitude threshold in all the error signals to a total quantity of error signals; and the performing maintenance on the communications link includes:

if the ratio of the quantity of error signals whose amplitudes are less than the error amplitude threshold in all the error signals to the total quantity of error signals is less than an error-center distribution ratio threshold, determining that a carrier on the communications link is interfered with.

With reference to the third aspect, in a fourth possible implementation manner, the complex-plane distribution feature parameter includes:

a second statistical value used to indicate a relationship between all the error signals and their respective received signals; or a third statistical value used to indicate a relationship between all the error signals and their respective decision signals.

With reference to the fourth possible implementation manner of the third aspect, in a fifth possible implementation manner, the second statistical value is generated by performing the following steps:

determining, for each of the error signals, a first angle between the error signal and a corresponding received signal; generating an average value of all the determined first angles after averaging or weighted averaging is performed on all the first angles; and using the average value as the second statistical value; and the performing maintenance on the communications link includes:

if the second statistical value is greater than a first perpendicular decision threshold, determining that a clock signal of a modulation device or a demodulation device on the communications link has a low precision or a phase error.

With reference to the fourth possible implementation manner of the third aspect, in a sixth possible implementation manner, the third statistical value is generated by performing the following steps:

determining, for each of the error signals, a second angle between the error signal and a corresponding decision signal; generating an average value of all the determined second angles after averaging or weighted averaging is performed on all the second angles; and using the average value as the third statistical value; and the performing maintenance on the communications link includes:

if the third statistical value is greater than a second perpendicular decision threshold, determining that a clock signal of a modulation device or a demodulation device on the communications link has a low precision or a phase error.

With reference to the fourth possible implementation manner of the third aspect, in a seventh possible implementation manner, the second statistical value is generated by performing the following steps:

determining a first correlation between an error-signal real-part sequence formed by real parts of all the error signals and a received-signal real-part sequence formed by real parts of all the received signals;

determining a second correlation between an error-signal imaginary-part sequence formed by imaginary parts of all the error signals and a received-signal imaginary-part sequence formed by imaginary parts of all the received signals; and using the first correlation and the second correlation as the second statistical value; and the performing maintenance on the communications link includes:

if an absolute value of at least one of the first correlation or the second correlation is greater than a first joint correlation threshold, and the first correlation and the second correlation are opposite in terms of sign, determining that carrier signals I and Q on the communications link are amplitude-imbalanced.

With reference to the fourth possible implementation manner of the third aspect, in an eighth possible implementation manner, the third statistical value is generated by performing the following steps:

determining a third correlation between an error-signal real-part sequence formed by real parts of all the error signals and a decision-signal real-part sequence formed by real parts of all the decision signals;

determining a fourth correlation between an error-signal imaginary-part sequence formed by imaginary parts of all the error signals and a decision-signal imaginary-part sequence formed by imaginary parts of all the decision signals; and using the third correlation and the fourth correlation as the third statistical value; and the performing maintenance on the communications link includes:

if an absolute value of at least one of the third correlation or the fourth correlation is greater than a second joint correlation threshold, and the third correlation and the fourth correlation are opposite in terms of sign, determining that carrier signals I and Q on the communications link are amplitude-imbalanced.

With reference to the fourth possible implementation manner of the third aspect, in a ninth possible implementation manner, the second statistical value is generated by performing the following steps:

determining a fifth correlation between an error-signal real-part sequence formed by real parts of all the error signals and a received-signal real-part sequence formed by real parts of all the received signals;

determining a sixth correlation between an error-signal imaginary-part sequence formed by imaginary parts of all the error signals and a received-signal imaginary-part sequence formed by imaginary parts of all the received signals; and using the fifth correlation and the sixth correlation as the second statistical value; and the performing maintenance on the communications link includes:

if both the fifth correlation and the sixth correlation are less than a third joint correlation threshold, determining that a gain compression fault occurs on the communications link, where the third joint correlation threshold is less than zero.

With reference to the fourth possible implementation manner of the third aspect, in a tenth possible implementation manner, the third statistical value is generated by performing the following steps:

determining a seventh correlation between an error-signal real-part sequence formed by real parts of all the error signals and a decision-signal real-part sequence formed by real parts of all the decision signals;

determining an eighth correlation between an error-signal imaginary-part sequence formed by imaginary parts of all the error signals and a decision-signal imaginary-part sequence formed by imaginary parts of all the decision signals; and using the seventh correlation and the eighth correlation as the third statistical value; and the performing maintenance on the communications link includes:

if both the seventh correlation and the eighth correlation are less than a fourth joint correlation threshold, determining that a gain compression fault occurs on the communications link, where the fourth joint correlation threshold is less than zero.

With reference to the fourth possible implementation manner of the third aspect, in an eleventh possible implementation manner, the second statistical value is generated by performing the following steps: determining a ninth correlation between an error-signal real-part sequence formed by real parts of all the error signals and a received-signal imaginary-part sequence formed by imaginary parts of all the received signals; and using the ninth correlation or an absolute value of the ninth correlation as the second statistical value; and the performing maintenance on the communications link includes: if the absolute value of the ninth correlation is greater than a first orthogonal correlation threshold, determining that carrier signals I and Q on the communications link are not orthogonal; or the second statistical value is generated by performing the following steps: determining a tenth correlation between an error-signal imaginary-part sequence formed by imaginary parts of all the error signals and a received-signal real-part sequence formed by real parts of all the received signals; and using the tenth correlation or an absolute value of the tenth correlation as the second statistical value; and the performing maintenance on the communications link includes: if the absolute value of the tenth correlation is greater than a second orthogonal correlation threshold, determining that carrier signals I and Q on the communications link are not orthogonal.

With reference to the fourth possible implementation manner of the third aspect, in a twelfth possible implementation manner, the third statistical value is generated by performing the following steps: determining an eleventh correlation between an error-signal real-part sequence formed by real parts of all the error signals and a decision-signal imaginary-part sequence formed by imaginary parts of all the decision signals; and using the eleventh correlation or an absolute value of the eleventh correlation as the third statistical value; and the performing maintenance on the communications link includes: if the absolute value of the eleventh correlation is greater than a third orthogonal correlation threshold, determining that carrier signals I and Q on the communications link are not orthogonal; or the third statistical value is generated by performing the following steps: determining a twelfth correlation between an error-signal imaginary-part sequence formed by imaginary parts of all the error signals and a decision-signal real-part sequence formed by real parts of all the decision signals; and using the twelfth correlation or an absolute value of the twelfth correlation as the third statistical value; and the performing maintenance on the communications link includes: if the absolute value of the twelfth correlation is greater than a fourth orthogonal correlation threshold, determining that carrier signals I and Q on the communications link are not orthogonal.

According to the network maintenance method provided in the third aspect of the present invention, a complex-plane distribution feature parameter used to indicate a distribution feature, on a complex plane, of signals received over a communications link is determined according to error signals between the signals received over the communications link and decision signals, and maintenance is performed on the communications link according to the complex-plane distribution feature parameter, thereby avoiding an inaccurate maintenance result in manual analysis of a constellation diagram. Because an automatic analysis method is used, efficiency is greatly improved compared with a method for manually analyzing a constellation diagram. In addition, there is no modulation order restriction because the foregoing complex-plane distribution feature parameter is obtained by using the error signals.

According to a fourth aspect, an embodiment of the present invention provides a network maintenance apparatus, including:

a first processing module, configured to obtain a complex-plane distribution feature parameter that indicates a distribution feature, on a complex plane, of signals received over a communications link on a network: and a second processing module, configured to perform maintenance on the communications link according to the complex-plane distribution feature parameter obtained by the first processing module; where the complex-plane distribution feature parameter is determined according to error signals between multiple signals received over the communications link and decision signals corresponding to all the received signals, and each of the received signal is corresponding to a point on the complex plane.

With reference to the fourth aspect, in a first possible implementation manner of the fourth aspect, the complex-plane distribution feature parameter includes:

a first statistical value obtained by collecting statistics about amplitudes, real parts, or imaginary parts of all the error signals.

With reference to the first possible implementation manner of the fourth aspect, in a second possible implementation manner, the first statistical value is a modulo of an average error signal obtained by averaging all the error signals, or an absolute value of a real part or an imaginary part of an average error signal; and the second processing module is specifically configured to: when one or more of the following conditions are met, determine that carrier signals I and Q of a modulation or demodulation device on the communications link are coupled to a line:

the modulo of the average error signal is greater than a modulo threshold of the average error signal;

the absolute value of the real part of the average error signal is greater than an absolute-value threshold of the real part of the average error signal; or the absolute value of the imaginary part of the average error signal is greater than an absolute-value threshold of the imaginary part of the average error signal.

With reference to the first possible implementation manner of the fourth aspect, in a third possible implementation manner, the first statistical value is a ratio of a quantity of error signals whose amplitudes are less than an error amplitude threshold in all the error signals to a total quantity of error signals; and the second processing module is specifically configured to: if the ratio of the quantity of error signals whose amplitudes are less than the error amplitude threshold in all the error signals to the total quantity of error signals is less than an error-center distribution ratio threshold, determine that a carrier on the communications link is interfered with.

With reference to the fourth aspect, in a fourth possible implementation manner, the complex-plane distribution feature parameter includes:

a second statistical value used to indicate a relationship between all the error signals and their respective received signals; or a third statistical value used to indicate a relationship between all the error signals and their respective decision signals.

With reference to the fourth possible implementation manner of the fourth aspect, in a fifth possible implementation manner, the second statistical value is generated by performing the following steps: determining, for each of the error signals, a first angle between the error signal and a corresponding received signal; generating an average value of all the determined first angles after averaging or weighted averaging is performed on all the first angles; and using the average value as the second statistical value; and the second processing module is specifically configured to: if the second statistical value is greater than a first perpendicular decision threshold, determine that a clock signal of a modulation device or a demodulation device on the communications link has a low precision or a phase error.

With reference to the fourth possible implementation manner of the fourth aspect, in a sixth possible implementation manner, the third statistical value is generated by performing the following steps: determining, for each of the error signals, a second angle between the error signal and a corresponding decision signal; generating an average value of all the determined second angles after averaging or weighted averaging is performed on all the second angles; and using the average value as the third statistical value; and the second processing module is specifically configured to: if the third statistical value is greater than a second perpendicular decision threshold, determine that a clock signal of a modulation device or a demodulation device on the communications link has a low precision or a phase error.

With reference to the fourth possible implementation manner of the fourth aspect, in a seventh possible implementation manner, the second statistical value is generated by performing the following steps: determining a first correlation between an error-signal real-part sequence formed by real parts of all the error signals and a received-signal real-part sequence formed by real parts of all the received signals; determining a second correlation between an error-signal imaginary-part sequence formed by imaginary parts of all the error signals and a received-signal imaginary-part sequence formed by imaginary' parts of all the received signals; and using the first correlation and the second correlation as the second statistical value; and the second processing module is specifically configured to: if an absolute value of at least one of the first correlation or the second correlation is greater than a first joint correlation threshold, and the first correlation and the second correlation are opposite in terms of sign, determine that carrier signals I and Q on the communications link are amplitude-imbalanced.

With reference to the fourth possible implementation manner of the fourth aspect, in an eighth possible implementation manner, the third statistical value is generated by performing the following steps: determining a third correlation between an error-signal real-part sequence formed by real parts of all the error signals and a decision-signal real-part sequence formed by real parts of all the decision signals; determining a fourth correlation between an error-signal imaginary-part sequence formed by imaginary parts of all the error signals and a decision-signal imaginary-part sequence formed by imaginary parts of all the decision signals; and using the third correlation and the fourth correlation as the third statistical value; and the second processing module is specifically configured to: if an absolute value of at least one of the third correlation or the fourth correlation is greater than a second joint correlation threshold, and the third correlation and the fourth correlation are opposite in terms of sign, determine that carrier signals I and Q on the communications link are amplitude-imbalanced.

With reference to the fourth possible implementation manner of the fourth aspect, in a ninth possible implementation manner, the second statistical value is generated by performing the following steps: determining a fifth correlation between an error-signal real-part sequence formed by real parts of all the error signals and a received-signal real-part sequence formed by real parts of all the received signals; determining a sixth correlation between an error-signal imaginary-part sequence formed by imaginary parts of all the error signals and a received-signal imaginary-part sequence formed by imaginary parts of all the received signals; and using the fifth correlation and the sixth correlation as the second statistical value; and the second processing module is specifically configured to: if both the fifth correlation and the sixth correlation are less than a third joint correlation threshold, determine that a gain compression fault occurs on the communications link, where the third joint correlation threshold is less than zero.

With reference to the fourth possible implementation manner of the fourth aspect, in a tenth possible implementation manner, the third statistical value is generated by performing the following steps: determining a seventh correlation between an error-signal real-part sequence formed by real parts of all the error signals and a decision-signal real-part sequence formed by real parts of all the decision signals; determining an eighth correlation between an error-signal imaginary-part sequence formed by imaginary parts of all the error signals and a decision-signal imaginary-part sequence formed by imaginary parts of all the decision signals; and using the seventh correlation and the eighth correlation as the third statistical value; and the second processing module is specifically configured to: if both the seventh correlation and the eighth correlation are less than a fourth joint correlation threshold, determine that a gain compression fault occurs on the communications link, where the fourth joint correlation threshold is less than zero.

With reference to the fourth possible implementation manner of the fourth aspect, in an eleventh possible implementation manner, the second statistical value is generated by performing the following steps: determining a ninth correlation between an error-signal real-part sequence formed by real parts of all the error signals and a received-signal imaginary-part sequence formed by imaginary parts of all the received signals; and using the ninth correlation or an absolute value of the ninth correlation as the second statistical value; and the second processing module is specifically configured to: if the absolute value of the ninth correlation is greater than a first orthogonal correlation threshold, determine that carrier signals I and Q on the communications link are not orthogonal; or the second statistical value is generated by performing the following steps: determining a tenth correlation between an error-signal imaginary-part sequence formed by imaginary parts of all the error signals and a received-signal real-part sequence formed by real parts of all the received signals; and using the tenth correlation or an absolute value of the tenth correlation as the second statistical value; and the second processing module is specifically configured to: if the absolute value of the tenth correlation is greater than a second orthogonal correlation threshold, determine that carrier signals I and Q on the communications link are not orthogonal.

With reference to the fourth possible implementation manner of the fourth aspect, in a twelfth possible implementation manner, the third statistical value is generated by performing the following steps: determining an eleventh correlation between an error-signal real-part sequence formed by real parts of all the error signals and a decision-signal imaginary-part sequence formed by imaginary parts of all the decision signals; and using the eleventh correlation or an absolute value of the eleventh correlation as the third statistical value; and the second processing module is specifically configured to: if the absolute value of the eleventh correlation is greater than a third orthogonal correlation threshold, determine that carrier signals I and Q on the communications link are not orthogonal; or the third statistical value is generated by performing the following steps: determining a twelfth correlation between an error-signal imaginary-part sequence formed by imaginary parts of all the error signals and a decision-signal real-part sequence formed by real parts of all the decision signals; and using the twelfth correlation or an absolute value of the twelfth correlation as the third statistical value; and the second processing module is specifically configured to: if the absolute value of the twelfth correlation is greater than a fourth orthogonal correlation threshold, determine that carrier signals I and Q on the communications link are not orthogonal.

According to the network maintenance apparatus provided in the fourth aspect of the present invention, a complex-plane distribution feature parameter used to indicate a distribution feature, on a complex plane, of signals received over a communications link is determined according to error signals between the signals received over the communications link and decision signals, and maintenance is performed on the communications link according to the complex-plane distribution feature parameter, thereby avoiding an inaccurate maintenance result in manual analysis of a constellation diagram. Because an automatic analysis method is used, efficiency is greatly improved compared with a method for manually analyzing a constellation diagram. In addition, there is no modulation order restriction because the foregoing complex-plane distribution feature parameter is obtained by using the error signals.

According to a fifth aspect, an embodiment of the present invention provides a network maintenance system, and the system includes a parameter obtaining apparatus and an maintenance apparatus, where:

the parameter obtaining apparatus is configured to: receive multiple signals over a communications link on a network, where each of the received signals is corresponding to a point on a complex plane; perform decision on each of the received signals, so as to obtain a decision signal; determine, for each of the received signals, an error signal between the received signal and a corresponding decision signal; determine, according to all the determined error signals, a complex-plane distribution feature parameter used to indicate a distribution feature, on the complex plane, of the signals received over the communications link; and send the determined complex-plane distribution feature parameter to the maintenance apparatus; and the maintenance apparatus is configured to perform maintenance on the communications link according to the complex-plane distribution feature parameter sent by the parameter obtaining apparatus.

According to the network maintenance system provided in the fifth aspect of the present invention, a complex-plane distribution feature parameter used to indicate a distribution feature, on a complex plane, of signals received over a communications link is determined according to error signals between the signals received over the communications link and decision signals, and maintenance is performed on the communications link according to the complex-plane distribution feature parameter, thereby avoiding an inaccurate maintenance result in manual analysis of a constellation diagram. Because an automatic analysis method is used, efficiency is greatly improved compared with a method for manually analyzing a constellation diagram. In addition, there is no modulation order restriction because the foregoing complex-plane distribution feature parameter is obtained by using the error signals.

With reference to the fifth aspect, in a first possible implementation manner, the parameter obtaining apparatus and the maintenance apparatus are located on a same device or different devices on the network.

When the parameter obtaining apparatus and the maintenance apparatus are located on different devices on the network, because the complex-plane distribution feature parameter having a relatively small data amount instead of a constellation diagram is transmitted between the devices, a problem that the constellation diagram needs to be stored and transmitted on the network in an existing method for manually analyzing a constellation diagram, which occupies relatively large storage space and relatively high data transmission bandwidth, is further resolved.

DESCRIPTION OF EMBODIMENTS

Figure 1:
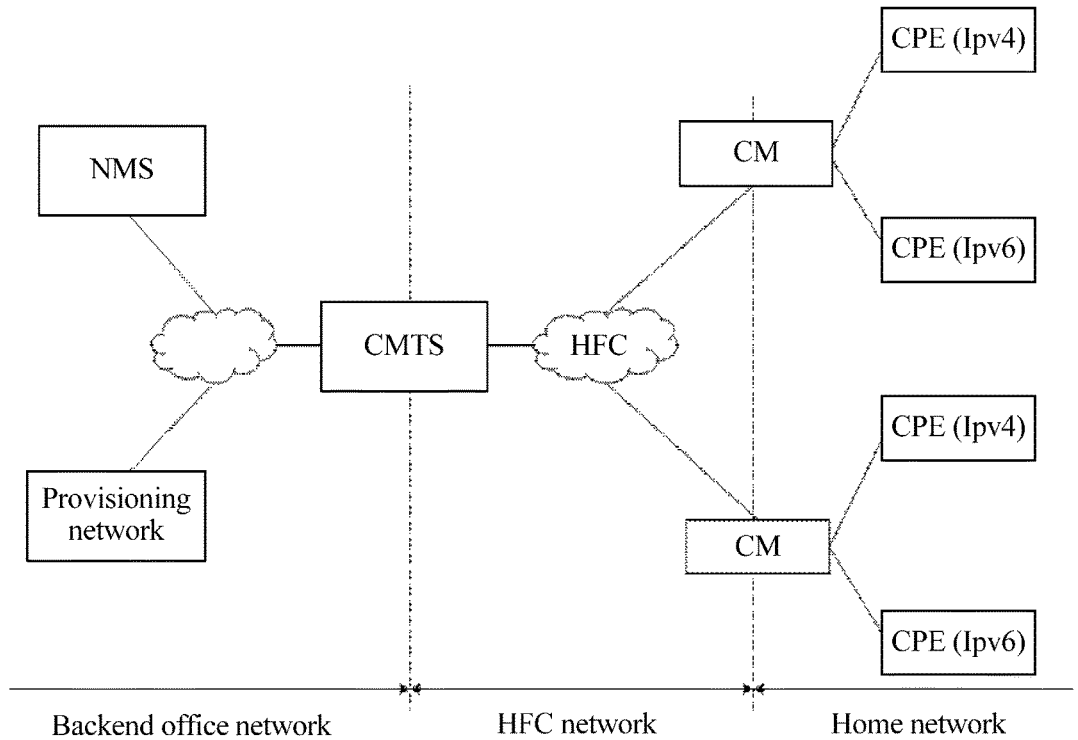
FIG. 1 is a diagram of a network architecture of an HFC network specified by the Cable Labs.

Embodiments of the present invention provide a parameter obtaining method and apparatus, and a network maintenance method, apparatus, and system, so as to resolve a problem that manual analysis of a received-signal constellation diagram is not applicable to a higher-order QAM scheme, and an analysis result depends on an technical level.

According to the parameter obtaining method provided in the embodiments of the present invention, multiple signals are received over a communications link on a network, where each of the received signals is corresponding to a point on a complex plane; decision is performed on each of the received signals, so as to obtain a decision signal; for each of the received signals, an error signal between the received signal and a corresponding decision signal is determined; and a complex-plane distribution feature parameter used to indicate a distribution feature, on the complex plane, of the signals received over the communications link is determined according to all the determined error signals.

In this method, a complex-plane distribution feature parameter used to indicate a distribution feature, on a complex plane, of signals received over a communications link is determined according to error signals between the signals received over the communications link and decision signals, thereby avoiding an inaccurate maintenance result in manual analysis of a constellation diagram. In addition, there is no modulation order restriction because the foregoing complex-plane distribution feature parameter is obtained by using the error signals.

According to the network maintenance method provided in the embodiments of the present invention, a complex-plane distribution feature parameter that indicates a distribution feature, on a complex plane, of signals received over a communications link on a network is obtained; and maintenance is performed on the communications link according to the obtained complex-plane distribution feature parameter, where the complex-plane distribution feature parameter is determined according to error signals between multiple signals received over the communications link and decision signals corresponding to all the received signals, and each of the received signals is corresponding to a point on the complex plane.

A principle of the method is similar to that of the parameter obtaining method provided in the embodiments of the present invention, where maintenance is performed on a communications link according to a complex-plane distribution feature parameter used to indicate a distribution feature, on a complex plane, of signals received over the communications link, and maintenance does not need to be performed according to a constellation diagram either. Therefore, there is no modulation order restriction. In addition, the constellation diagram does not need to be manually analyzed, which has advantages that an maintenance result is accurate and there is no technical level restriction, so that maintenance has a more accurate result and higher efficiency.

The network maintenance system provided in the embodiments of the present invention includes a parameter obtaining apparatus and an maintenance apparatus. The parameter obtaining apparatus is configured to: receive multiple signals over a communications link on a network, where each of the received signals is corresponding to a point on a complex plane; perform decision on each of the received signals, so as to obtain a decision signal; determine, for each of the received signals, an error signal between the received signal and a corresponding decision signal; determine, according to all the determined error signals, a complex-plane distribution feature parameter used to indicate a distribution feature, on the complex plane, of the signals received over the communications link; and send the determined complex-plane distribution feature parameter to the maintenance apparatus. The maintenance apparatus is configured to perform maintenance on the communications link according to the complex-plane distribution feature parameter sent by the parameter obtaining apparatus.

A principle of the system is similar to that of the parameter obtaining method and the network maintenance method provided in the embodiments of the present invention, and also have an effect of avoiding an inaccurate result in manual analysis of a constellation diagram, and also have no modulation order restriction.

Figure 2:
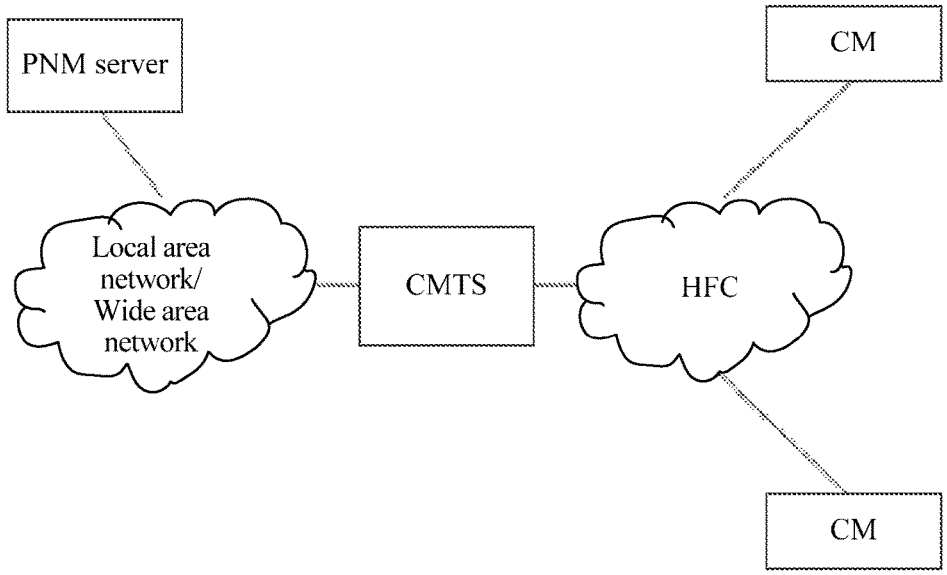
FIG. 2 is a diagram of an architecture of a typical HFC network.

In the system, when the parameter obtaining apparatus and the maintenance apparatus are located on different devices on the network, for example, on an HFC network shown in FIG. 2, the parameter obtaining apparatus that is connected on a communications link on the HFC network, such as a CMTS or a CM, has a signal collection function, and the parameter obtaining apparatus receives signals on a communications link on the HFC network, determines corresponding error signals, and obtains a complex-plane distribution feature parameter according to the error signals.

The foregoing parameter obtaining apparatus sends the determined complex-plane distribution feature parameter to the maintenance apparatus that is on the HFC network and that can analyze the complex-plane distribution feature parameter and perform maintenance on the HFC network, for example, a PNM server. The maintenance apparatus performs maintenance on the communications link on the HFC network according to the received complex-plane distribution feature parameter.

In this application scenario, the foregoing parameter obtaining apparatus and maintenance apparatus cooperate to perform maintenance on the communications link on the HFC network, thereby further resolving a problem that a constellation diagram needs to be transmitted in an existing method for manually analyzing a constellation diagram, which involves a large data amount and occupies a relatively large quantity of network resources. For example, as specified by DOCSIS 3.1 formulated by the Cable Labs, at least 8192 constellation points need to be transmitted for each constellation diagram, which requires a large storage capacity and occupies relatively high network bandwidth.

However, in the foregoing application scenario, the parameter obtaining apparatus determines the complex-plane distribution feature parameter, and sends the determined complex-plane distribution feature parameter to the maintenance apparatus. The maintenance apparatus performs maintenance on the communications link according to the complex-plane distribution feature parameter. The complex-plane distribution feature parameter instead of a constellation diagram is transmitted between the parameter obtaining apparatus and the maintenance apparatus, which greatly reduces a data storage capacity and requires occupation of only relatively small network bandwidth.

It should be noted that although the HFC network is used as an example herein, it does not indicate that the apparatuses and the methods provided in the embodiments of the present invention are applicable only to the HFC network. Actually, for any signal transmission network (each signal transmitted on the network is corresponding to a point on a complex plane), the apparatuses and the methods provided in the embodiments of the present invention can be used to resolve a problem that manual analysis of a received-signal constellation diagram for maintenance occupies a relatively large quantity of network resources and is not applicable to a higher-order QAM scheme, and an analysis result depends on an technical level.

To better understand the methods in the embodiments of the present invention, the following first describes concepts involved in the embodiments of the present invention.

1. Constellation Point

Figure 6:
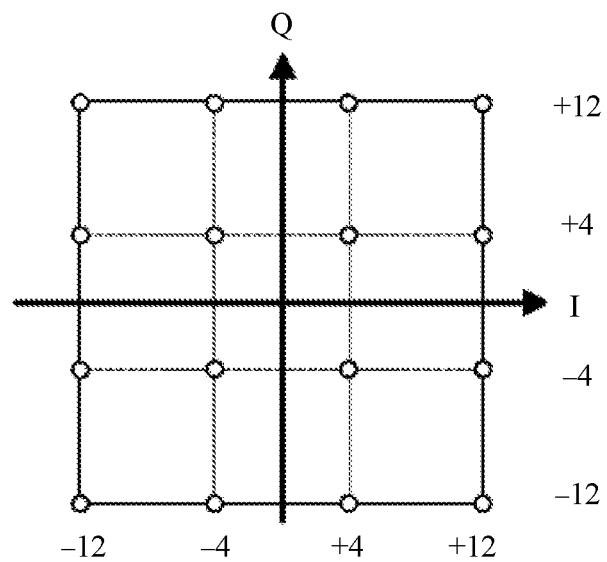
FIG. 6 is a 16QAM constellation diagram.

For QAM, a bit stream is mapped into a complex number signal (that is, a constellation point) by using a constellation mapping relationship. For example, for 16-QAM, a piece of 4bit data (16 possibilities) is mapped into one of 16 constellation points shown in FIG. 6 (for example, a bit stream "1111" is mapped into a constellation point at an upper right corner, and a bit stream "0011" is mapped into a constellation point at a lower left corner).

2. Transmitted Signal Tx

In the embodiments of the present invention, at a signal transmit end, a transmitted signal (a complex number signal) can be expressed by using Tx=(Itx, Qtx). Itx is a real part of the transmitted signal, and Qtx is an imaginary part of the transmitted signal. The transmitted signal Tx is modulated onto a communications line by using two orthogonal signals I and Q.

3. Received Signal Rx

A transmitted signal Tx is balanced after passing through a channel and is demodulated at a receive end by using orthogonal signals I and Q of a same frequency, so that the received signal Rx=(Irx, Qrx) can be obtained.

4. Decision Signal Tx'

A decision signal obtained by the receive end by means of signal decision is Tx'=(Itx', Qtx').

For example, a constellation mapping point closest to Rx is used as Tx', or in some cases, if a transmitted signal is known, Tx'=Tx. For another example, decision is performed on a received signal by using a complex coding and decoding method such as trellis coded modulation (TCM).

5. Error Signal Err

Due to impact of noise and another factor, an error exists between a received signal and a transmitted signal (if the error is embodied in a constellation diagram, the error is an error between a received constellation point and a transmitted constellation point). Herein, the error is identified by using Err=(Ie, Qe), and is referred to as an "error signal", where $$Err=Rx-Tx'=(Irx-Itx', Qrx-Qtx').$$

The foregoing describes the concepts involved in the embodiments of the present invention. To better understand the embodiments of the present invention, the following briefly describes an invention idea of the present invention.

As described above, when a fault occurs on a communications link, for constellation diagrams having different types of faults, received signals in the constellation diagrams have different distribution features on complex planes. Therefore, when a method for manually analyzing a constellation diagram is used for fault determining, a type of a fault is determined by manually analyzing a distribution feature of received signals in a faulty constellation diagram.

Also as mentioned above, the method for manually analyzing a constellation diagram has a problem that an analysis result depends on an engineer' technical level and may be inaccurate. Therefore, after analyzing a large quantity of different faulty constellation diagrams, distribution features of received signals in different types of faulty constellation diagrams are summarized; for different types of faults, scientifically constructs complex-plane distribution feature parameters used to indicate the distribution features, on the complex planes, of the received signals; and after verifying and correcting the complex-plane distribution feature parameters through repeated experiments, finally implements that whether a fault occurs on the communications link and a corresponding type of a fault are accurately determined by using the complex-plane distribution feature parameters, thereby avoiding a problem that manual analysis of a constellation diagram may be inaccurate.

The following describes the embodiments of the present invention in detail with reference to the accompanying drawings.

Figure 7:
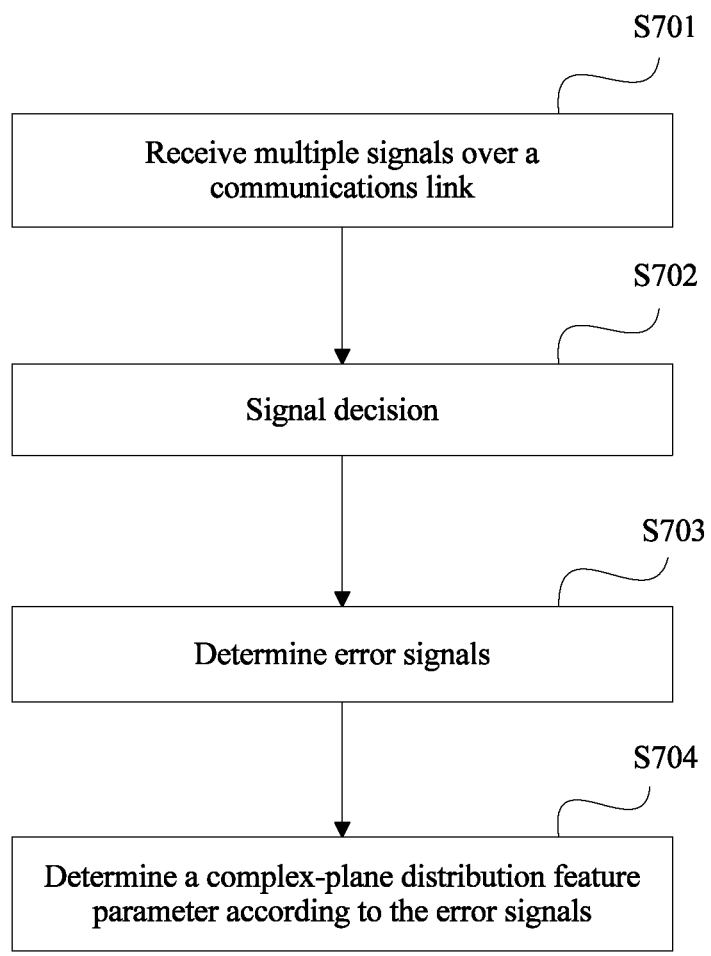
FIG. 7 is a flowchart of a parameter obtaining method according to an embodiment of the present invention.

FIG. 7 is a flowchart of a parameter obtaining method according to an embodiment of the present invention. As shown in FIG. 7, the method includes the following steps:

S701. Receive multiple signals over a communications link on a network, where each of the received signals is corresponding to a point on a complex plane.

S702. Perform decision on each of the received signals, so as to obtain a decision signal.

S703. Determine, for each of the received signals, an error signal between the received signal and a corresponding decision signal.

S704. Determine, according to all the determined error signals, a complex-plane distribution feature parameter used to indicate a distribution feature, on the complex plane, of the signals received over the communications link.

For example, in step S701, N signals $Rx_i$ are received over a communications link on the network; in step S702, decision is performed on each of the received signals $Rx_i$, so as to obtain a decision signal $Tx_i'$; in step S703, for each of the received signals, an error signal $Err_i$ between the received signal and a corresponding decision signal is determined. In the foregoing steps, $i=1 \ldots N$, and N is an integer greater than 1.

Optionally, after step S704, the following steps may be further included:

performing maintenance on the communications link according to the determined complex-plane distribution feature parameter. This step and steps S701-S704 may be performed by a same device on the network, or may be performed by different devices on the network. When this step and steps S701-S704 are performed by different devices on the network, a device may perform step S704 of determining the complex-plane distribution feature parameter and then send the complex-plane distribution feature parameter to another device, and the another device performs maintenance on the communications link according to the received complex-plane distribution feature parameter.

If the parameter obtaining method provided in this embodiment of the present invention is applied to an HFC network, for all the steps shown in FIG. 7, steps S701-S704 may be performed by a parameter obtaining apparatus (such as a CM or a CMTS) on the foregoing HFC network. After step S704, the step of performing maintenance on the communications link may be performed by an maintenance apparatus (such as a PNM server) on the HFC network.

In step S704, the complex-plane distribution feature parameter determined according to the error signals may include but is not limited to six types listed in Table 1. Optionally, when meeting their respective determining conditions, the six types of complex-plane distribution feature parameters may separately indicate different communications link faults. Optionally, if maintenance is performed on the communications link according to the complex-plane distribution feature parameter, when the complex-plane distribution feature parameter meets a corresponding determining condition, it is determined that a corresponding fault occurs on the communications link. For brevity in the following description, for each of the complex-plane distribution feature parameters in Table 1, a name is defined for a communications link fault that can be indicated by the parameter.

TABLE 1

| Complex-plane distribution feature parameter | Communications link fault that can be indicated |
| --- | --- |
| Error average value | Poor carrier suppression |
| Error-center distribution ratio | Carrier interference |
| Angle between an error and a signal | Phase error |

TABLE 1-continued

| Complex-plane distribution feature parameter | Communications link fault that can be indicated |
| --- | --- |
| Correlation (used to determine that carrier signals I and Q are amplitude-imbalanced) between an error and a signal | Carrier signals I and Q are amplitude-imbalanced |
| Correlation (used to determine "gain compression") between an error and a signal | Gain compression |
| Orthogonal correlation between an error and a signal | Carrier signals I and Q are not orthogonal |

The first two complex-plane distribution feature parameters (the error average value and the error-center distribution ratio) in Table 1 are determined according to error signals, and indicate a distribution feature of amplitudes, real parts, or imaginary parts of all the error signals. Other complex-plane distribution feature parameters in Table 1 are determined according to error signals and corresponding signals (received signals or decision signals), and indicate a relationship between all the error signals and their respective signals.

The following describes in detail one by one the complex-plane distribution feature parameters in Table 1, the parameter obtaining method, and communications link faults that can be indicated.

1. Error Average Value

The error average value can be generated by performing the following two steps:

averaging all the error signals, so as to obtain an average error signal; and obtaining a modulo of the average error signal, or obtaining an absolute value of a real part or an imaginary part of the average error signal.

All N error signals $Err_i$ are averaged (that is, real parts and imaginary parts of the N error signals are separately averaged), so as to obtain the average error signal: $Ave_e$=(Iavee, Qavee).

The complex-plane distribution feature parameter-error average value is obtained by obtaining a modulo of the average error signal $Ave_e$ or obtaining an absolute value of a real part or an imaginary part of $Ave_e$.

Optionally, after the average error signal $Ave_e$ is obtained, before the error average value is generated, the obtained average error signal $Ave_e$ is normalized, so as to obtain a normalized average error signal $Ave$-$norm_e$. When the error average value is being generated, a modulo of the normalized average error signal $Ave$-$norm_e$ is obtained or an absolute value of a real part or an imaginary part of the normalized average error signal $Ave$-$norm_e$ is obtained, and the modulo or the absolute value is used as the error average value.

Optionally, the average error signal $Ave_e$ is normalized by using statistical information of the error signals. Specifically, during normalization, one of the following methods can be used:

1. Normalization is performed by using a maximum amplitude of the error signals $Err_i$: $Ave$-$norm_e$=$Ave_e$/Max-$|Err_i|$, where Max means obtaining a maximum value.

2. Normalization is performed by using a mean squared error of the error signals $Err_i$: $Ave$-$norm_e$=$Ave_e$/MSE($Err_i$), where MSE (Mean Squared Error) means obtaining the mean squared error.

3. Normalization is performed by extracting a square root of a sum of squares of amplitudes of the error signals $Err_i$:

$$Ave\text{-}norm_e = Ave_e \bigg/ sqrt\bigg(\sum_{i=1\sim N} |Err_i|^2/N\bigg),$$

where sqrt means extracting the square root.

It should be noted that the foregoing three types of statistical information are merely exemplary. During specific implementation, another method may also be used to perform normalization.

The complex-plane distribution feature parameter-error average value can indicate that a "poor carrier suppression" fault occurs on the communications link.

Figure 8:
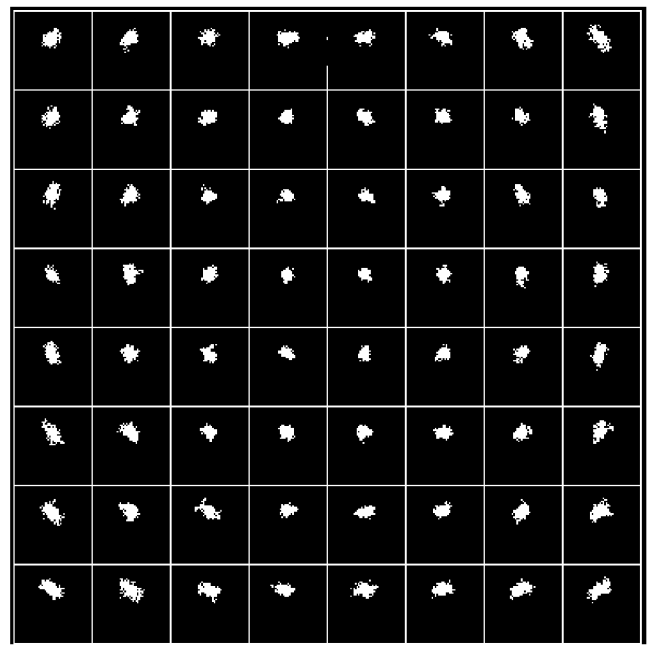
FIG. 8 is a received-signal constellation diagram when a "poor carrier suppression" fault occurs.

By analyzing a large quantity of constellation diagrams in which the "poor carrier suppression" fault occurs, it is found that the constellation diagram in which the fault occurs is characterized by that all constellation points deviate in a same direction (for example, upwards, downwards, leftwards, or rightwards) (as shown in FIG. 8). After a large quantity of experiments and calculations, it comes to the following conclusion: When no fault occurs, an average value of error signals is close to 0 (the error signal may be randomly a positive value or a negative value, and the positive value and the negative value are offset after being added up); on the contrary, in the constellation diagram in which the "poor carrier suppression" fault occurs, the error average value deviates from 0. Therefore, it is finally determined that the complex-plane distribution feature parameter that can indicate a type of a "poor carrier suppression" fault is generated by using a method in which an average value is obtained by averaging all the error signals.

Optionally, that the error average value is greater than an error average value threshold T6 indicates that the "poor carrier suppression" fault occurs on the communications link. Specifically, in a situation in which the error average value is the modulo of the average error signal, T6 is a modulo threshold T61 of the average error signal;

in a situation in which the error average value is the absolute value of the real part of the average error signal, T6 is an absolute-value threshold T62 of the real part of the average error signal; or in a situation in which the error average value is the absolute value of the imaginary part of the average error signal, T6 is an absolute-value threshold T63 of the imaginary part of the average error signal.

Optionally, maintenance is performed on the communications link according to the complex-plane distribution feature parameter-error average value. For example, whether the "poor carrier suppression" fault occurs on the communications link is determined.

It should be noted that fault determining can be performed according to the error average value, and a status of the communications link can also be determined according to the error average value, so as to provide reference for maintenance of the communications link.

Optionally, a cause of occurrence of the "poor carrier suppression" fault and/or a directive suggestion for clearing the fault can be provided according to a result of the fault determining:

The cause of the "poor carrier suppression" fault: Carrier signals I and Q of a modulation or demodulation device on the communications link are coupled to a line.

The suggestion for clearing the "poor carrier suppression" fault: Decouple the carrier signals I and Q of the modulation or demodulation device from the line, so as to prevent a modulating signal from being leaked to the line.

Further, optionally, a signal-to-noise ratio (SNR) or modulation error ratio (MER) after the fault is cleared can be estimated.

For example, a ratio of noise after the fault is cleared to current noise is estimated by using $(1-Ave\text{-}norm_e^2)$. Then, the SNR or MER after the fault is cleared is calculated by using the ratio.

SNR (after the fault is cleared)=SNR (before the fault is cleared)$-10*\log 10(1-Ave\text{-}norm_e^2)$.

MER (after the fault is cleared)=MER (before the fault is cleared)$-10*\log 10(1-Ave\text{-}norm_e^2)$.

2. Error-Center Distribution Ratio

The "error-center distribution ratio" refers to a ratio of $Err_i$ whose amplitudes are less than (or less than or equal to) an error amplitude threshold to the N $Err_i$, that is, a total quantity of $Err_i$ is N, and if a quantity of $Err_i$ that meet a condition $|Err_i|<T2$ (which may also be less than or equal to) is N1, N1/N is the "error-center distribution ratio".

Herein, T2 is the error amplitude threshold, which may be a preset fixed value, or may be set according to $Err_i$. Optionally, T2 is a value related to a mathematical statistical value of $Err_i$, for example, $$T2 = 0.5 \times sqrt\bigg(\sum_{i=1\sim N} |Err_i|^2/N\bigg) \text{ or } 0.5 \times MSE(Err_i).$$

Optionally, the error-center distribution ratio can be identified by using err-center-ratio.

Figure 3:
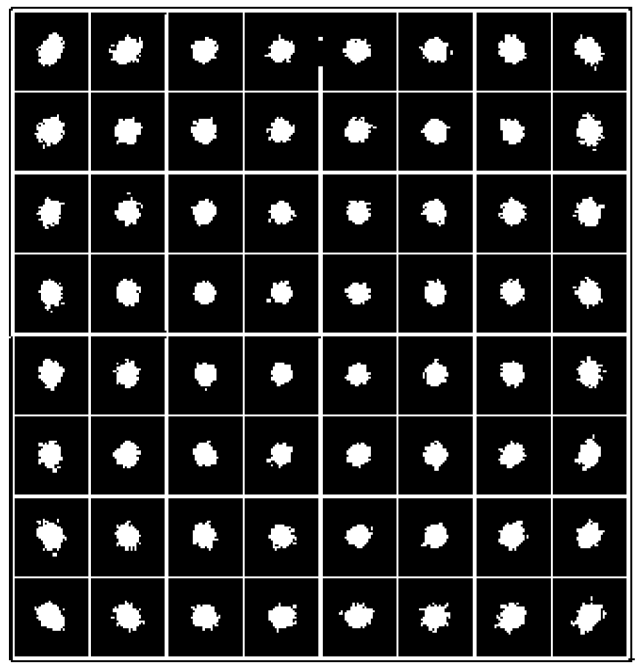
FIG. 3 is a normal received-signal constellation diagram.
Figure 9:
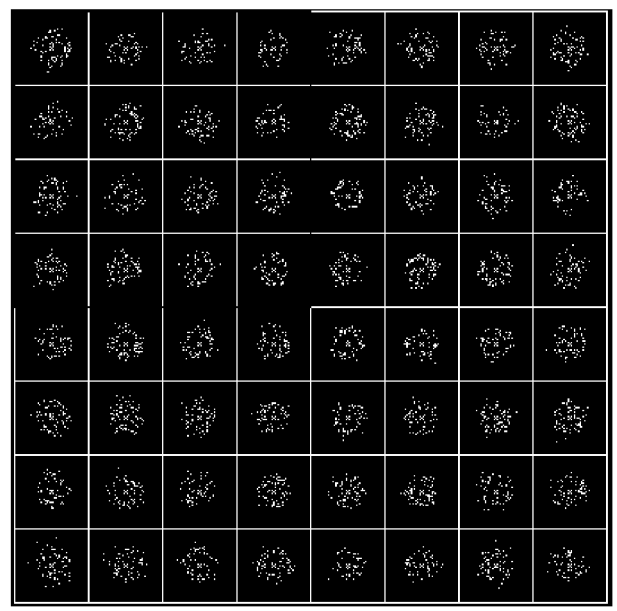
FIG. 9 is a received-signal constellation diagram when a "carrier interference" fault occurs.

By analyzing a large quantity of constellation diagrams in which a "carrier interference" fault occurs, it is found that the constellation diagram in which the fault occurs is characterized by that constellation points are distributed in a circular shape or an annular shape (as shown in FIG. 9), while constellation points in a constellation diagram in which no fault occurs are normally distributed and are in the centers of all grids in the constellation diagram (as shown in FIG. 3). After a large quantity of experiments and calculations, it comes to the following conclusion: When the "carrier interference" fault occurs, a probability that each constellation point in a constellation diagram is located in the center of each grid is low, which is equivalent to that a probability that an amplitude of an error signal corresponding to the constellation point is relatively small is low. Therefore, it is finally determined that a ratio of error signals whose amplitudes are relatively small in all error signals is used as the complex-plane distribution feature parameter that can indicate the "carrier interference" fault.

Optionally, that the error-center distribution ratio is less than an error-center distribution ratio threshold T8 indicates that the "carrier interference" fault occurs on the communications link.

Optionally, maintenance can be performed on the communications link according to the error-center distribution ratio.

For example, whether the "carrier interference" fault occurs on the communications link is determined according to the error-center distribution ratio.

Herein, fault determining is used as an example of maintenance. It should be noted that whether the "carrier interference" fault occurs on the communications link can be determined according to the error-center distribution ratio, and a status of the communications link can also be determined according to the error-center distribution ratio, so as to provide reference for maintenance of the communications link.

Further, optionally, a cause of occurrence of the "carrier interference" fault and/or a directive suggestion for clearing the fault can be provided according to a result of determining the foregoing "carrier interference" fault.

The cause of the "carrier interference" fault:
1) External interference; or
2) Harmonic interference caused by distortion of an active device.

The suggestion for clearing the "carrier interference" fault:
1) Check whether radio interference exists on a corresponding carrier frequency;
2) Check whether a cable is damaged and leads to interference; or
3) Check whether an active component is distorted, for example, whether the component is damaged or a parameter is improperly adjusted.

Further, optionally, a frequency on which carrier interference occurs can be provided. The frequency on which carrier interference occurs is a frequency of a channel or subcarrier corresponding to the received signal.

3. Angle between an error and a signal

A method for determining the angle between an error and a signal is as follows:

For each error signal $Err_i$, determining an angle $\theta_i$ between the error signal $Err_i$ and a corresponding received signal $Rx_i$ (or an angle between the error signal $Err_i$ and a corresponding decision signal $Tx_i'$, where an angle between an error signal and a received signal is used as an example in the following; and for implementation of an angle between an error signal and a decision signal, refer to the former case, and details are not described herein).

Figure 12:
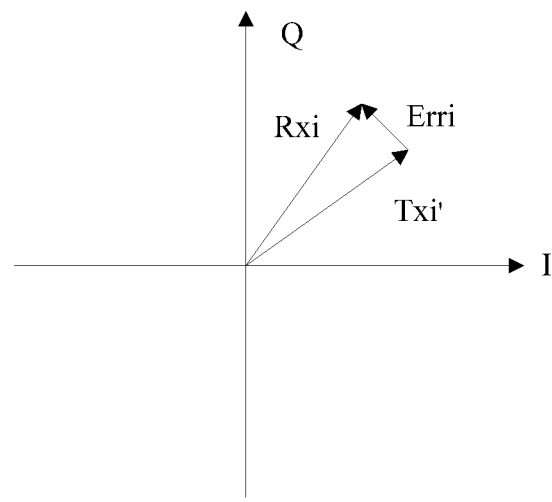
FIG. 12 is a diagram of a situation in which an error signal $Err_i$ and a received signal $Rx_i$ are nearly perpendicular according to an embodiment of the present invention.
Figure 13:
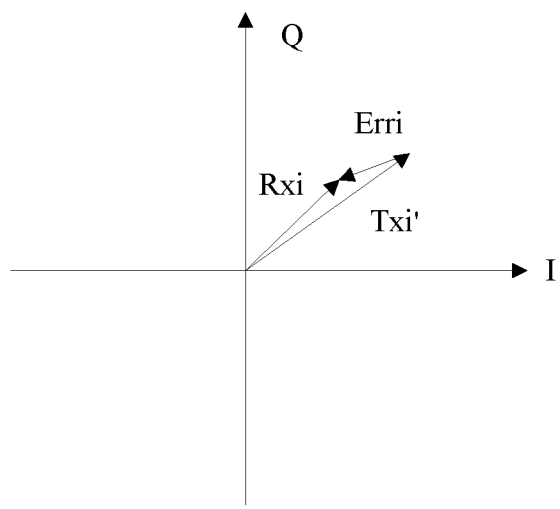
FIG. 13 is a diagram of a situation in which an error signal $Err_i$ and a received signal $Rx_i$ are nearly parallel according to an embodiment of the present invention.

$\theta_i$ is used to indicate an extent to which the received signal $Rx_i$ is perpendicular to the error signal $Err_i$. One optional solution is that $\theta_i$ is a value from 0 degree to 90 degrees, where 0 indicates that the two signals are completely parallel, 90 indicates that the two signals are completely perpendicular, and a value between 0 and 90 indicates that the two signals are neither perpendicular nor parallel. FIG. 12 and FIG. 13 respectively show a situation in which the error signal $Err_i$ and the received signal $Rx_i$ are nearly perpendicular and a situation in which the error signal $Err_i$ and the received signal $Rx_i$ are nearly parallel.

The complex-plane distribution feature parameter-angle between an error and a signal is generated by performing averaging or weighted averaging on all $\theta_i$.

Herein, "averaging" means directly averaging all $\theta_i$, or performing averaging by using amplitudes or amplitude functions of all the error signals $Err_i$ as weights. For example, in the following example, the complex-plane distribution feature parameter-angle $\theta$ between an error and a signal is obtained by performing averaging by using square values of amplitudes of all the error signals $Err_i$ as weights:

$$\theta = \frac{\sum_{i=1\sim N}(|Err_i|^2 \theta_i)}{\sum_{i=1\sim N}|Err_i|^2},$$

where $|Err_i|^2$ is a weight used for each $\theta_i$ when $\theta_i$ is averaged. By using the amplitudes of $Err_i$ as the weights, impact imposed, by some random errors whose amplitudes are relatively small, on accuracy of the complex-plane distribution feature parameter-angle between an error and a signal can be avoided.

Figure 4:
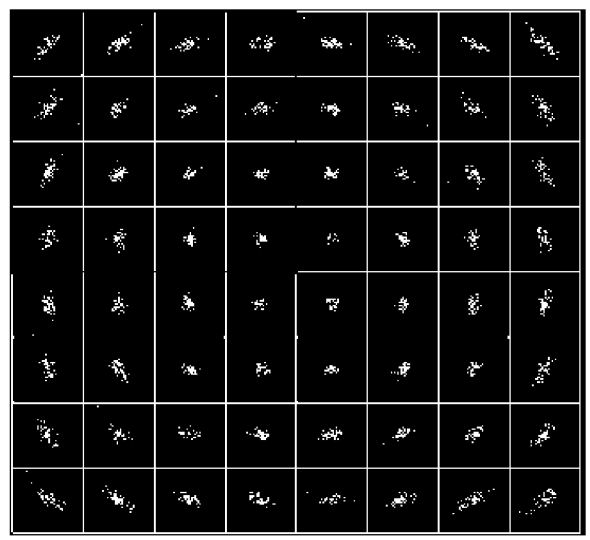
FIG. 4 is a received-signal constellation diagram when a phase error occurs.

By analyzing a large quantity of constellation diagrams in which a "phase error" fault occurs, it is found that the constellation diagram in which the fault occurs is characterized by that constellation points rotate around an original point (that is, a point whose coordinates are (0,0) in the constellation diagram) (as shown in FIG. 4). After a large quantity of experiments and calculations, it comes to the following conclusion: The error signal and the received signal are nearly perpendicular when the "phase error" occurs. Therefore, it is finally determined that the angle between an error and a signal can indicate the "phase error" fault.

That the angle between an error and a signal indicates that the signal and the error are nearly perpendicular indicates that the "phase error" fault occurs. Specifically, when the angle $\theta$ between an error and a signal is greater than a perpendicular decision threshold T3, it can be determined that the signal and the error are nearly perpendicular.

Optionally, maintenance is performed on the communications link according to the complex-plane distribution feature parameter-angle between an error and a signal. Optionally, when the angle $\theta$ between an error and a signal is greater than the perpendicular decision threshold T3, it is determined that the "phase error" fault occurs on the communications link.

Herein, fault determining is used as an example of maintenance. It should be noted that whether the "phase error" fault occurs on the communications link can be determined according to the angle between an error and a signal, and a status of the communications link can also be determined according to the angle between an error and a signal, so as to provide reference for maintenance of the communications link.

Further, optionally, a cause of occurrence of the "phase error" fault and/or a directive suggestion for clearing the fault are/is provided.

The cause of the phase error fault: A clock signal of a modulation or demodulation device has a low precision or a phase error.

The directive suggestion for clearing the phase error fault: Measure clock signal precision of the modulation or demodulation device.

Further, optionally, an SNR or an MER after the fault is cleared can be estimated.

For example, a ratio of noise after the fault is cleared to current noise is estimated by using)$\cos(\theta)$. Then, the SNR or MER after the fault is cleared is calculated by using the ratio.

SNR (after the fault is cleared)=SNR (before the fault is cleared)−10*log 10($\cos^2(\theta)$).

MER (after the fault is cleared)=MER (before the fault is cleared)−10*log 10($\cos^2(\theta)$).

Further, optionally, multiple thresholds can be selected for the perpendicular decision threshold T3. For example, T3-1, T3-2, . . . .

When the angle $\theta$ between an error and a signal is greater than T3-1, it is determined that the phase error fault occurs.

When the angle $\theta$ between an error and a signal is greater than T3-2, it is determined that the phase error fault is severe.

By analogy, different situations of the phase error fault can be determined.

4. Correlation (that Indicates that "Carrier Signals I and Q are Amplitude-Imbalanced") Between an Error and a Signal The correlation between an error and a signal can be determined by using the following method:

determining a correlation between an error-signal sequence {$Err_i$} formed by all the error signals $Err_i$ and a received-signal sequence {Rx$_i$} formed by the received signals (or a correlation between the error-signal sequence {Err$_i$} formed by all the error signals Err$_i$ and a decision-signal sequence {Tx$_i$'} formed by decision signals Tx$_i$', where a correlation between an error-signal sequence and a received-signal sequence is used as an example in the following; for implementation of a correlation between an error-signal sequence and a decision-signal sequence, refer to the former case, and details are not described herein).

Because both the received signal and the error signal are complex number signals, and a correlation between complex numbers is rarely calculated mathematically, we can calculate correlations by separately using real parts and imaginary parts of the received-signal and the error-signal.

It is assumed that a sequence formed by real parts of N error signals is:

Ie (1, 2, . . . , N)=(Ie$_1$, Ie$_2$, . . . , Ie$_N$); and
a sequence formed by real parts of N received signals is:
Irx (1, 2, . . . , N)=(Irx$_1$, Irx$_2$, . . . , Irx$_N$).

A correlation between the two sequences is calculated, that is, a real-part correlation corr–I.

Mathematically, the correlation is generally a value from −1 to +1 by means of normalization. A larger absolute value of the correlation indicates a stronger correlation. That corr–I=1 indicates that the two sequences are completely correlated, that corr–I=0 indicates that the two sequences are completely non-correlated, and that corr–I=−1 indicates that the two sequences are negatively correlated. In the industry, there are many correlation calculation methods that are beyond a description scope of the present invention and are not described one by one. In the present invention, any one of the correlation calculation methods can be used.

Likewise, an imaginary-part correlation corr–Q between imaginary-part sequences of the error signals and the received signals can be calculated.

The correlation corr–I and the correlation corr–Q are the correlation between an error and a signal.

Figure 10:
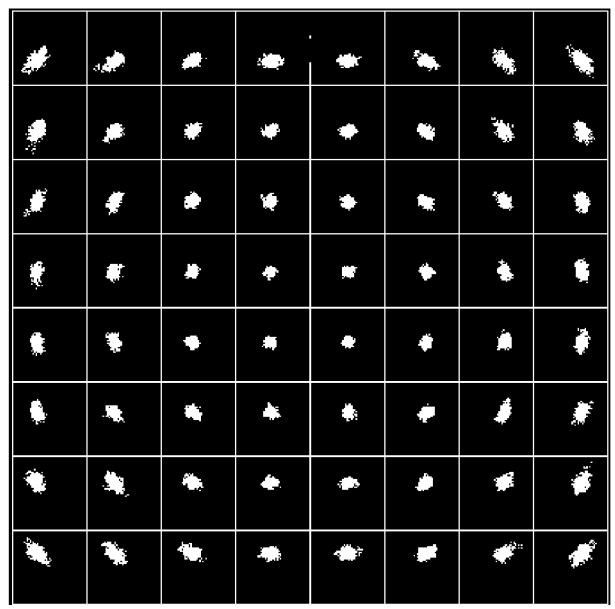
FIG. 10 is a received-signal constellation diagram when a fault that "carrier signals I and Q are amplitude-imbalanced" occurs.

By analyzing a large quantity of constellation diagrams in which a fault that "carrier signals I and Q are amplitude-imbalanced" occurs, it is found that the constellation diagram in which the fault occurs is characterized by that constellation points are distributed in a rectangular shape (as shown in FIG. 10). After a large quantity of experiments and calculations, it comes to the following conclusion: When the fault that "carrier signals I and Q are amplitude-imbalanced" occurs, an absolute value of a real part of the signal is directly proportional to an absolute value of a real part of the error signal, and an absolute value of an imaginary part of the signal is directly proportional to an absolute value of an imaginary part of the error signal; and in addition, if the real parts are positively correlated, the imaginary parts are negatively correlated; or if the real parts are negatively correlated, the imaginary parts are positively correlated. Therefore, it is finally determined that the correlation between a signal and an error is used as the complex-plane distribution feature parameter that indicates that "carrier signals I and Q are amplitude-imbalanced" on the communications link. Specifically, that an absolute value of at least one of the foregoing two correlations corr–I and corr–Q is greater than a first joint correlation threshold T5 and that the two correlations are opposite in terms of sign indicate that carrier signals I and Q on the communications link are amplitude-imbalanced, where the modulating signal herein refers to a signal used for modulating a to-be-modulated signal.

Optionally, maintenance is performed on the communications link according to the complex-plane distribution feature parameter-correlation between an error and a signal.

For example, if the absolute value of at least one of the foregoing two correlations corr–I and corr–Q is greater than the first joint correlation threshold T5, and the two correlations are opposite in terms of sign, it is determined that the fault that "carrier signals I and Q are amplitude-imbalanced" occurs on the communications link.

Herein, fault determining is used as an example of maintenance. It should be noted that whether the fault that "carrier signals I and Q are amplitude-imbalanced" occurs on the communications link can be determined according to the correlation between an error and a signal, and a status of the communications link can also be determined according to the correlation between an error and a signal, so as to provide reference for maintenance of the communications link.

Further, optionally, a cause of occurrence of the fault that "carrier signals I and Q are amplitude-imbalanced" and/or a directive suggestion for clearing the fault can be provided according to a result of the foregoing fault determining.

The cause of the fault that "carrier signals I and Q are amplitude-imbalanced": Amplitudes of the Carrier signals I and Q of a modulation or demodulation device are inconsistent.

The directive suggestion for clearing the fault that "carrier signals I and Q are amplitude-imbalanced": Adjust the amplitudes of the Carrier signals I and Q of the modulation or demodulation device, so as to make the amplitudes of the Carrier signals I and Q consistent.

Further, optionally, an SNR or an MER after the fault is cleared can be estimated. For example, a ratio of noise after the fault is cleared to current noise is estimated by using $(1-\text{corr}-I^2)$. Then, the SNR or MER after the fault is cleared is calculated by using the ratio.

SNR (after the fault is cleared)=SNR (before the fault is cleared)$-10*\log 10(1-\text{corr}-I^2)$.

MER (after the fault is cleared)=MER (before the fault is cleared)$-10*\log 10(1-\text{corr}-I^2)$.

5. Correlation (that Indicates a "Gain Compression" Fault) Between an Error and a Signal Herein, because a correlation calculation method is the same as that of the foregoing correlation (which indicates that "carrier signals I and Q are amplitude-imbalanced) between an error and a signal, details are not described.

DOCSIS 3.1 describes the "gain compression" fault as "amplifier compression and laser clipping", which indicates that when signals on the communications link pass through an amplifier or a laser, a signal whose amplitude is relatively large is distorted, and the amplitude is compressed.

Optionally, that two correlations corr–I and corr–Q are both less than a third joint correlation threshold T7 indicates that the "gain compression" fault occurs on the communications link. T7 is less than zero.

Optionally, maintenance can be performed on the communications link according to the correlation between an error and a signal.

For example, when the two correlations corr–I and corr–Q are both less than the third joint correlation threshold T7, it is determined that the "gain compression" fault occurs on the communications link. Herein, fault determining is used as an example of maintenance. It should be noted that whether the "gain compression" fault occurs on the communications link can be determined according to the correlation between an error and a signal, and a status of the communications link can also be determined according to the correlation between an error and a signal, so as to provide reference for maintenance of the communications link.

Further, optionally, a cause of occurrence of the "gain compression" fault and/or a directive suggestion for clearing the fault can be provided according to a result of the foregoing fault determining.

The cause of the "gain compression" fault: Clipping is performed on a laser due to excessively high power of a signal, or another device is saturated.

The directive suggestion for clearing the "gain compression" fault: Lower transmit power, increase attenuation of an attenuator, or reduce a gain of an amplifier.

6. Orthogonal Correlation Between an Error and a Signal

The orthogonal correlation between an error and a signal can be determined in one of the following manners:

correlating an error-signal real-part sequence formed by real parts of all the error signals with a received-signal imaginary-part sequence formed by imaginary parts of all the received signals; optionally, obtaining an absolute value of an obtained correlation; and using the obtained correlation or the absolute value of the correlation as a first orthogonal correlation corr–IQ1;

correlating an error-signal imaginary-part sequence formed by imaginary parts of all the error signals with a received-signal real-part sequence formed by real parts of all the received signals; optionally, obtaining an absolute value of an obtained correlation; and using the obtained correlation or the absolute value of the correlation as a second orthogonal correlation corr–QI2;

correlating an error-signal real-part sequence formed by real parts of all the error signals with a decision-signal imaginary-part sequence formed by imaginary parts of all the decision signals; optionally, obtaining an absolute value of an obtained correlation; and using the obtained correlation or the absolute value of the correlation as a third orthogonal correlation corr–IQ3; or correlating an error-signal imaginary-part sequence formed by imaginary parts of all the error signals with a decision-signal real-part sequence formed by real parts of all the decision signals; optionally, obtaining an absolute value of an obtained correlation; and using the obtained correlation or the absolute value of the correlation as a fourth orthogonal correlation corr–QI4.

All the foregoing fourth orthogonal correlations can be used as the complex-plane distribution feature parameter-orthogonal correlation between an error and a signal.

Figure 11:
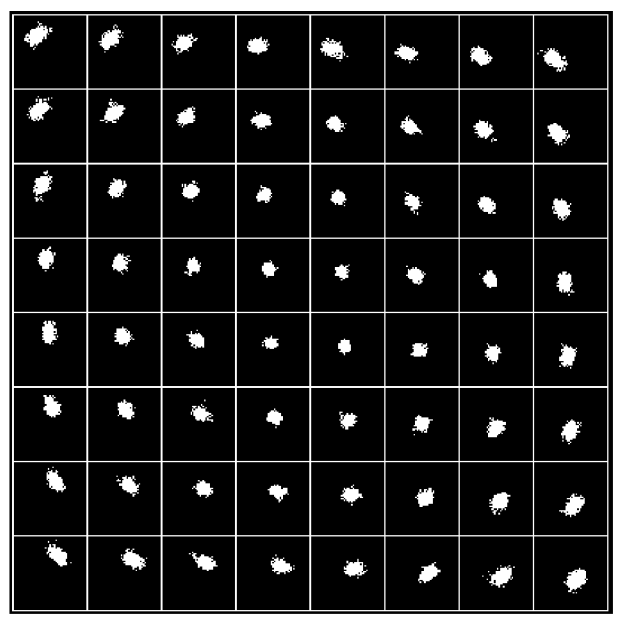
FIG. 11 is a received-signal constellation diagram when a fault that "carrier signals I and Q are not orthogonal" occurs.

By analyzing a large quantity of constellation diagrams in which a fault that "carrier signals I and Q are not orthogonal" occurs, it is found that the constellation diagram in which the fault occurs is characterized by that constellation points are distributed in a rhombic shape (as shown in FIG. 11). After a large quantity of experiments and calculations, it comes to the following conclusion: When the fault that "carrier signals I and Q are not orthogonal" occurs, an absolute value of a real part of the signal is directly proportional to an absolute value of an imaginary part of the error signal, and an absolute value of an imaginary part of the signal is directly proportional to an absolute value of a real part of the error signal. Therefore, it is finally determined that the orthogonal correlation between a signal and an error is used as the complex-plane distribution feature parameter that indicates that "carrier signals I and Q are not orthogonal" on the communications link.

When that "carrier signals I and Q not orthogonal" on the communications link is indicated, a same corresponding orthogonal correlation threshold T4 can be set for the foregoing four orthogonal correlations. Accordingly, when the orthogonal correlation between an error and a signal is greater than T4, it indicates that "carrier signals I and Q are not orthogonal" on the communications link.

Optionally, a corresponding orthogonal correlation threshold can be separately set for each of the foregoing orthogonal correlations. For example, corr–IQ1 is corresponding to a first orthogonal correlation threshold T41, corr–QI2 is corresponding to a second orthogonal correlation threshold T42, corr–IQ3 is corresponding to a third orthogonal correlation threshold T43, and corr–QI4 is corresponding to a fourth orthogonal correlation threshold T44.

Accordingly, if corr–IQ1 is used as the complex-plane distribution feature parameter-orthogonal correlation between an error and a signal, that |corr–IQ1|>T41 can indicate that the fault that "carrier signals I and Q are not orthogonal" occurs on the communications link.

If corr–QI2 is used as the complex-plane distribution feature parameter-orthogonal correlation between an error and a signal, that |corr–QI2|>T42 can indicate that the fault that "carrier signals I and Q are not orthogonal" occurs on the communications link.

If corr–IQ3 is used as the complex-plane distribution feature parameter-orthogonal correlation between an error and a signal, that |corr–IQ3|>T43 can indicate that the fault that "carrier signals I and Q are not orthogonal" occurs on the communications link.

If corr–QI4 is used as the complex-plane distribution feature parameter-orthogonal correlation between an error and a signal, that |corr–QI4|>T44 can indicate that the fault that "carrier signals I and Q are not orthogonal" occurs on the communications link.

Optionally, maintenance can be performed on the communications link according to the orthogonal correlation between an error and a signal.

For example, if the foregoing same orthogonal correlation threshold T4 is set for the foregoing four orthogonal correlations, accordingly, when the orthogonal correlation between an error and a signal is greater than T4, it is determined that the fault that "carrier signals I and Q are not orthogonal" occurs on the communications link.

If the foregoing corresponding orthogonal correlation threshold is set for each of the foregoing orthogonal correlations, and if corr–IQ1 is used as the orthogonal correlation between an error and a signal, when |corr–IQ1|>T41, it is determined that the fault that "carrier signals I and Q are not orthogonal" occurs on the communications link;

if corr–QI2 is used as the orthogonal correlation between an error and a signal, when |corr–QI2|>T42, it is determined that the fault that "carrier signals I and Q are not orthogonal" occurs on the communications link;

if corr–IQ3 is used as the orthogonal correlation between an error and a signal, when |corr–IQ3|>T43, it is determined that the fault that "carrier signals I and Q are not orthogonal" occurs on the communications link; or if corr–QI4 is used as the orthogonal correlation between an error and a signal, when |corr–QI4|>T44, it is determined that the fault that "carrier signals I and Q are not orthogonal" occurs on the communications link.

Herein, fault determining is used as an example of maintenance. It should be noted that whether the fault that "carrier signals I and Q are not orthogonal" occurs on the communications link can be determined according to the orthogonal correlation between an error and a signal, and a status of the communications link can also be determined according to the orthogonal correlation between an error and a signal, so as to provide reference for maintenance of the communications link.

Further, optionally, a cause of occurrence of the fault that "carrier signals I and Q are not orthogonal" and/or a directive suggestion for clearing the fault can be provided according to a result of the foregoing fault determining.

The cause of the fault that "carrier signals I and Q are not orthogonal": The Carrier signals I and Q of a modulation or demodulation device are not orthogonal.

The directive suggestion for clearing the fault that "carrier signals I and Q are not orthogonal": Adjust orthogonality of the Carrier signals I and Q of the modulation or demodulation device, so as to make the Carrier signals I and Q orthogonal.

Further, optionally, an SNR or an MER after the fault is cleared can be estimated.

For example, a ratio of noise after the fault is cleared to current noise is estimated by using $(1-\text{corr-IQ}^2)$. Then, the SNR or MER after the fault is cleared is calculated by using the ratio.

SNR (after the fault is cleared)=SNR (before the fault is cleared)$-10*\log 10(1-\text{corr-IQ}^2)$.

MER (after the fault is cleared)=MER (before the fault is cleared)$-10*\log 10(1-\text{corr-IQ}^2)$.

The foregoing describes six complex-plane distribution feature parameters, and optional methods for separately performing maintenance on the communications link separately according to each of the complex-plane distribution feature parameters.

Optionally, all the complex-plane distribution feature parameters can be combined to indicate a communications link fault. Further, optionally, maintenance can be performed on the communications link by combining all the complex-plane distribution feature parameters. As shown in the following Table 2, in Table 2, definitions of a communications link fault that can be indicated, the complex-plane distribution feature parameters, and all the thresholds are consistent with the foregoing description.

When a method shown in Table 2 is used, a fault is determined by combining all the complex-plane distribution feature parameters, thereby improving accuracy in a result of fault determining. Optionally, the complex-plane distribution feature parameters, or results of comparing the complex-plane distribution feature parameters with corresponding thresholds can be entered into a Bayesian system (an expert system for network maintenance). The Bayesian system provides, according to a feature of a complex-plane distribution feature parameter corresponding to each fault, a conclusion for the fault or a probability that the fault occurs.

The foregoing describes methods for obtaining all the complex-plane distribution feature parameters, and optional methods for performing maintenance on the communications link according to the complex-plane distribution feature parameters. In step S701 in this method, the multiple signals are received over a communications link on the network. Manners of signal receiving include but are not limited to the following several manners:

Manner 1: Signals are separately received on some channels or some subcarriers of the communications link at a same moment.

Manner 2: Signals are separately received on all channels or all subcarriers of the communications link at a same moment.

Manner 3: Signals existing at different moments are received on one channel or one subcarrier of the communications link.

Manner 4: Signals existing at different moments are received on some channels or some subcarriers of the communications link.

Manner 5: Signals existing at different moments are received on all channels or all subcarriers of the communications link.

For example, for a network using an orthogonal frequency division multiplexing (OFDM) modulation scheme, a chan-

TABLE 2

| Communications link fault that can be indicated | Angle between an error and a signal | Correlations corr-I and corr-Q between an error and a signal | Orthogonal correlation | Error average value | Error-center distribution ratio |
|---|---|---|---|---|---|
| Gain compression | <45° | Both of the correlations are less than T7. | ≈0 | ≈0 | |
| Carrier signals I and Q are amplitude-imbalanced | <45° | An absolute value of at least one of the two correlations is greater than T5, and the two correlations are opposite in terms of sign. | ≈0 | ≈0 | |
| Carrier signals I and Q are not orthogonal | <45° | ≈0 | An absolute value is greater than T4. | ≈0 | |
| Phase error | >T3 | ≈0 | ≈0 | ≈0 | |
| Carrier interference | ≈45° | ≈0 | ≈0 | ≈0 | <T8 |
| Poor carrier suppression | ≈45° | ≈0 | ≈0 | An absolute value is greater than T6. | | nel is divided, in a frequency domain, into multiple subcarriers (for example, in a DOCSIS 3.1 system, a channel may be divided into 8192 subcarriers), a signal is received on each subcarrier, and the complex-plane distribution feature parameter is determined according to the multiple received signals.

For Manner 3 to Manner 5, the signals existing at different moments are received, and when maintenance is performed on the communications link, the signals can be used to locate a fault that frequently occurs on the communications link. For Manner 1 and Manner 2, the signals existing at a same moment are received, which can reduce duration for signal collection, and improve maintenance efficiency.

In addition, optionally, the step S701 of receiving multiple signals includes:

receiving, over the communications link, multiple signals that meet a set condition.

Optionally, the foregoing set condition includes:

an amplitude of the received signal is greater than a first signal selection amplitude threshold; or an absolute value of a real part of the received signal is greater than a first signal selection real-part absolute-value threshold; or an absolute value of an imaginary part of the received signal is greater than a first signal selection imaginary-part absolute-value threshold; or an amplitude of the received signal is not greater than a second signal selection amplitude threshold; or an absolute value of a real part of the received signal is not greater than a second signal selection real-part absolute-value threshold; or an absolute value of an imaginary part of the received signal is not greater than a second signal selection imaginary-part absolute-value threshold.

By setting the foregoing condition, screening of signals on the communications link can be implemented. For a specific example, refer to the following Example 1.

Example 1

Example 1 provides an example of signal screening.

Figure 5:
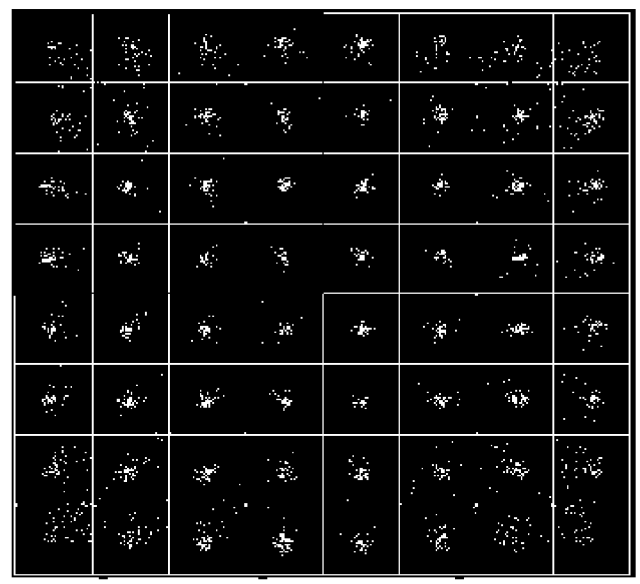
FIG. 5 is a received-signal constellation diagram when a gain compression error occurs.

When some faults (such as the "gain compression" fault shown in FIG. 5) occur, only peripheral constellation points in the constellation diagram are affected. For the peripheral constellation points in the constellation diagram, a fault symptom is more obvious. Therefore, when the complex-plane distribution feature parameter is being determined, optionally, a fault situation can be better reflected by selecting a received signal $Rx_i$ or decision signal $Tx_i'$ outside an area.

Specifically, M points are selected from N constellation points, where $1<M \le N$, and M is a positive integer. A condition for selecting the M points may be that signals are outside a range. The following are examples of two decision conditions.

Decision condition 1: An amplitude of the signal (the received signal or the decision signal) is greater than a threshold, and mathematically, the following expression can be used:

$|Rx_i|>T1$ (T1 in the expression is a threshold, $Rx_i$ in the expression can also be replaced with $Tx_i'$, and a greater-than sign can also be replaced with $\ge$): The formula indicates that "the signal is outside a circle with a radius of T1" is used as the decision condition.

Decision condition 2: An absolute value of a real part of the signal is greater than a threshold or an absolute value of an imaginary part is greater than a threshold.

$|I_{rx}|>T1$ or $|Q_{rx}|>T1$ (T1 in the expression is a threshold, $Rx_i$ in the expression can also be replaced with $Tx_i'$, and a greater-than sign can also be replaced with $\ge$): The formula indicates that "the signal is outside a quadrate with a side length of 2*T1 is used as the decision condition.

The foregoing describes a parameter obtaining method provided in the embodiments of the present invention. Based on a same invention idea, the embodiments of the present invention further provide a parameter obtaining apparatus. A principle of the apparatus for resolving a technical problem is similar to that of the parameter obtaining method provided in the embodiments of the present invention. Therefore, for implementation of the apparatus, refer to implementation of the parameter obtaining method, and details are not described.

Figure 14:
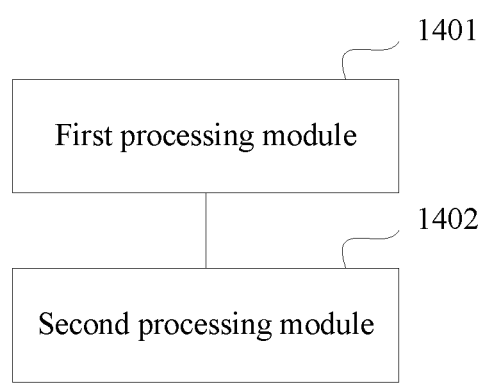
FIG. 14 is a schematic structural diagram of a first parameter obtaining apparatus according to an embodiment of the present invention.

FIG. 14 is a schematic structural diagram of a first parameter obtaining apparatus according to an embodiment of the present invention. As shown in FIG. 14, the apparatus includes:

a first processing module 1401, configured to: receive multiple signals over a communications link on a network, where each of the received signals is corresponding to a point on a complex plane; perform decision on each of the received signals, so as to obtain a decision signal; and determine, for each of the received signals, an error signal between the received signal and a corresponding decision signal; and a second processing module 1402, configured to determine, according to all the error signals determined by the first processing module 1401, a complex-plane distribution feature parameter used to indicate a distribution feature, on the complex plane, of the signals received over the communications link.

Optionally, similar to a parameter obtaining method provided in the embodiments of the present invention, each complex-plane distribution feature parameter can also be used to indicate a communications link fault. Further, optionally, the second processing module 1402 may be further configured to perform maintenance on the communications link according to the determined complex-plane distribution feature parameter.

For a definition of the complex-plane distribution feature parameter involved in the apparatus, a communications link fault that can be indicated, and optionally, a solution of performing maintenance on the communications link by the apparatus, refer to the parameter obtaining method provided in the embodiments of the present invention.

Optionally, the second processing module 1402 is specifically configured to:

collect statistics about amplitudes, real parts, or imaginary parts of all the error signals, so as to generate a first statistical value; and use the generated first statistical value as the complex-plane distribution feature parameter.

Optionally, the second processing module 1402 is specifically configured to: average all the error signals, so as to obtain an average error signal; obtain a modulo of the average error signal, or obtain an absolute value of a real part or an imaginary part of the average error signal; and use the modulo or the absolute value as the first statistical value; where that the first statistical value meets one or more of the following conditions indicates that carrier signals I and Q of a modulation or demodulation device on the communications link are coupled to a line:

the modulo of the average error signal is greater than a modulo threshold of the average error signal;

the absolute value of the real part of the average error signal is greater than an absolute-value threshold of the real part of the average error signal; or the absolute value of the imaginary part of the average error signal is greater than an absolute-value threshold of the imaginary part of the average error signal.

Optionally, the second processing module 1402 is specifically configured to use, as the first statistical value, a ratio of a quantity of error signals whose amplitudes are less than an error amplitude threshold in all the error signals to a total quantity of error signals; where that the first statistical value meets the following condition indicates that a carrier on the communications link is interfered with:

the ratio of the quantity of error signals whose amplitudes are less than the error amplitude threshold in all the error signals to the total quantity of error signals is less than an error-center distribution ratio threshold.

Optionally, the second processing module 1402 is specifically configured to:

determine a second statistical value used to indicate a relationship between all the error signals and their respective received signals, and use the second statistical value as the complex-plane distribution feature parameter; or determine a third statistical value used to indicate a relationship between all the error signals and their respective decision signals, and use the third statistical value as the complex-plane distribution feature parameter.

Optionally, the second processing module 1402 is specifically configured to:

determine, for each of the error signals, a first angle between the error signal and a corresponding received signal; generate an average value of all the determined first angles after averaging or weighted averaging is performed on all the first angles; and use the average value as the second statistical value; where that the second statistical value is greater than a first perpendicular decision threshold indicates that a clock signal of a modulation device or a demodulation device on the communications link has a low precision or a phase error.

Optionally, the second processing module 1402 is specifically configured to: determine, for each of the error signals, a second angle between the error signal and a corresponding decision signal; generate an average value of all the determined second angles after averaging or weighted averaging is performed on all the second angles; and use the average value as the third statistical value; where that the third statistical value is greater than a second perpendicular decision threshold indicates that a clock signal of a modulation device or a demodulation device on the communications link has a low precision or a phase error.

Optionally, the second processing module 1402 is specifically configured to: determine a first correlation between an error-signal real-part sequence formed by real parts of all the error signals and a received-signal real-part sequence formed by real parts of all the received signals; determine a second correlation between an error-signal imaginary-part sequence formed by imaginary parts of all the error signals and a received-signal imaginary-part sequence formed by imaginary parts of all the received signals; and use the first correlation and the second correlation as the second statistical value; where that an absolute value of at least one of the first correlation or the second correlation is greater than a first joint correlation threshold and that the first correlation and the second correlation are opposite in terms of sign indicate that carrier signals I and Q on the communications link are amplitude-imbalanced.

Optionally, the second processing module 1402 is specifically configured to: determine a third correlation between an error-signal real-part sequence formed by real parts of all the error signals and a decision-signal real-part sequence formed by real parts of all the decision signals; determine a fourth correlation between an error-signal imaginary-part sequence formed by imaginary parts of all the error signals and a decision-signal imaginary-part sequence formed by imaginary parts of all the decision signals; and use the third correlation and the fourth correlation as the third statistical value; where that an absolute value of at least one of the third correlation or the fourth correlation is greater than a second joint correlation threshold and that the third correlation and the fourth correlation are opposite in terms of sign indicate that carrier signals I and Q on the communications link are amplitude-imbalanced.

Optionally, the second processing module 1402 is specifically configured to: determine a fifth correlation between an error-signal real-part sequence formed by real parts of all the error signals and a received-signal real-part sequence formed by real parts of all the received signals; determine a sixth correlation between an error-signal imaginary-part sequence formed by imaginary parts of all the error signals and a received-signal imaginary-part sequence formed by imaginary parts of all the received signals; and use the fifth correlation and the sixth correlation as the second statistical value; where that both the fifth correlation and the sixth correlation are less than a third joint correlation threshold indicates that a gain compression fault occurs on the communications link, where the third joint correlation threshold is less than zero.

Optionally, the second processing module 1402 is specifically configured to: determine a seventh correlation between an error-signal real-part sequence formed by real parts of all the error signals and a decision-signal real-part sequence formed by real parts of all the decision signals; determine an eighth correlation between an error-signal imaginary-part sequence formed by imaginary parts of all the error signals and a decision-signal imaginary-part sequence formed by imaginary parts of all the decision signals; and use the seventh correlation and the eighth correlation as the third statistical value; where that both the seventh correlation and the eighth correlation are less than a fourth joint correlation threshold indicates that a gain compression fault occurs on the communications link, where the fourth joint correlation threshold is less than zero.

Optionally, the second processing module 1402 is specifically configured to: determine a ninth correlation between an error-signal real-part sequence formed by real parts of all the error signals and a received-signal imaginary-part sequence formed by imaginary parts of all the received signals; and use the ninth correlation or an absolute value of the ninth correlation as the second statistical value; where that the absolute value of the ninth correlation is greater than a first orthogonal correlation threshold indicates that carrier signals I and Q on the communications link are not orthogonal; or the second processing module 1402 is specifically configured to: determine a tenth correlation between an error-signal imaginary-part sequence formed by imaginary parts of all the error signals and a received-signal real-part sequence formed by real parts of all the received signals; and use the tenth correlation or an absolute value of the tenth correlation as the second statistical value; where that the absolute value of the tenth correlation is greater than a second orthogonal correlation threshold indicates that carrier signals I and Q on the communications link are not orthogonal.

Optionally, the second processing module 1402 is specifically configured to: determine an eleventh correlation between an error-signal real-part sequence formed by real parts of all the error signals and a decision-signal imaginary-part sequence formed by imaginary parts of all the decision signals; and use the eleventh correlation or an absolute value of the eleventh correlation as the third statistical value; where that the absolute value of the eleventh correlation is greater than a third orthogonal correlation threshold indicates that carrier signals I and Q on the communications link are not orthogonal; or the second processing module 1402 is specifically configured to: determine a twelfth correlation between an error-signal imaginary-part sequence formed by imaginary parts of all the error signals and a decision-signal real-part sequence formed by real parts of all the decision signals; and use the twelfth correlation or an absolute value of the twelfth correlation as the third statistical value; where that the absolute value of the twelfth correlation is greater than a fourth orthogonal correlation threshold indicates that carrier signals I and Q on the communications link are not orthogonal.

Optionally, the first processing module 1401 is specifically configured to:

separately receive signals on some channels or some subcarriers of the communications link at a same moment; or separately receive signals on all channels or all subcarriers of the communications link at a same moment; or receive signals existing at different moments on one channel or one subcarrier of the communications link; or receive signals existing at different moments on some channels or some subcarriers of the communications link; or receive signals existing at different moments on all channels or all subcarriers of the communications link.

Optionally, the first processing module 1401 is specifically configured to:

receive, over the communications link, multiple signals that meet a set condition.

Optionally, the set condition includes:

an amplitude of the received signal is greater than a first signal selection amplitude threshold; or an absolute value of a real part of the received signal is greater than a first signal selection real-part absolute-value threshold; or an absolute value of an imaginary part of the received signal is greater than a first signal selection imaginary-part absolute-value threshold; or an amplitude of the received signal is not greater than a second signal selection amplitude threshold; or an absolute value of a real part of the received signal is not greater than a second signal selection real-part absolute-value threshold; or an absolute value of an imaginary part of the received signal is not greater than a second signal selection imaginary-part absolute-value threshold.

Figure 15:
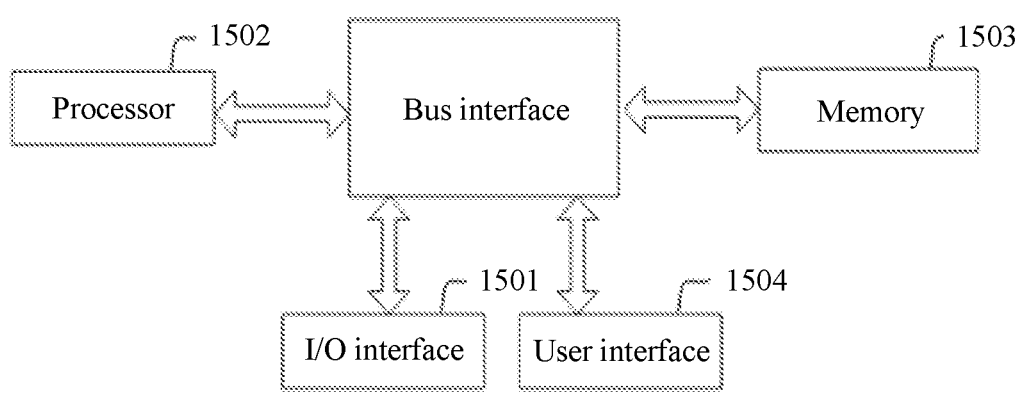
FIG. 15 is a schematic structural diagram of a second parameter obtaining apparatus according to an embodiment of the present invention.

FIG. 15 is a schematic structural diagram of a second parameter obtaining apparatus according to an embodiment of the present invention. As shown in FIG. 15, the apparatus includes:

an I/O interface 1501, configured to: receive multiple signals over a communications link on a network, where each of the received signals is corresponding to a point on a complex plane; perform decision on each of the received signals, so as to obtain a decision signal; and determine, for each of the received signals, an error signal between the received signal and a corresponding decision signal; and a processor 1502, configured to determine, according to all the error signals determined by the I/O interface 1501, a complex-plane distribution feature parameter used to indicate a distribution feature, on the complex plane, of the signals received over the communications link.

In FIG. 15, a bus architecture may include any quantity of interconnected buses and bridges, which specifically link various circuits of one or more processors indicated by the processor 1502 and an interfacing apparatus indicated by the I/O interface 1501. The bus architecture may further link various other circuits such as a peripheral device, a voltage regulator, and a power management circuit, which is well known in the art, and therefore no further description is provided in this specification. A bus interface provides an interface. A memory 1503 may include one or more storage units. For different user equipment, a user interface 1504 may be further an interface that can externally connect to required devices, where the connected devices include but are not limited to a keypad, a display, a loudspeaker, a microphone, a joystick, and the like.

Optionally, similar to a parameter obtaining method provided in the embodiments of the present invention, each complex-plane distribution feature parameter can also be used to indicate a communications link fault. Further, optionally, the processor 1502 may be further configured to perform maintenance on the communications link according to the determined complex-plane distribution feature parameter.

For a definition of the complex-plane distribution feature parameter involved in the apparatus, a communications link fault that can be indicated, and optionally, a solution of performing maintenance on the communications link by the apparatus, refer to the parameter obtaining method provided in the embodiments of the present invention.

Optionally, the processor 1502 is specifically configured to:

collect statistics about amplitudes, real parts, or imaginary parts of all the error signals, so as to generate a first statistical value; and use the generated first statistical value as the complex-plane distribution feature parameter.

Optionally, the processor 1502 is specifically configured to: average all the error signals, so as to obtain an average error signal; obtain a modulo of the average error signal, or obtain an absolute value of a real part or an imaginary part of the average error signal; and use the modulo or the absolute value as the first statistical value; where that the first statistical value meets one or more of the following conditions indicates that carrier signals I and Q of a modulation or demodulation device on the communications link are coupled to a line:

the modulo of the average error signal is greater than a modulo threshold of the average error signal;

the absolute value of the real part of the average error signal is greater than an absolute-value threshold of the real part of the average error signal; or the absolute value of the imaginary part of the average error signal is greater than an absolute-value threshold of the imaginary part of the average error signal.

Optionally, the processor 1502 is specifically configured to use, as the first statistical value, a ratio of a quantity of error signals whose amplitudes are less than an error amplitude threshold in all the error signals to a total quantity of error signals; where that the first statistical value meets the following condition indicates that a carrier on the communications link is interfered with:

the ratio of the quantity of error signals whose amplitudes are less than the error amplitude threshold in all the error signals to the total quantity of error signals is less than an error-center distribution ratio threshold.

Optionally, the processor 1502 is specifically configured to:

determine a second statistical value used to indicate a relationship between all the error signals and their respective received signals, and use the second statistical value as the complex-plane distribution feature parameter; or determine a third statistical value used to indicate a relationship between all the error signals and their respective decision signals, and use the third statistical value as the complex-plane distribution feature parameter.

Optionally, the processor 1502 is specifically configured to: determine, for each of the error signals, a first angle between the error signal and a corresponding received signal; generate an average value of all the determined first angles after averaging or weighted averaging is performed on all the first angles; and use the average value as the second statistical value; where that the second statistical value is greater than a first perpendicular decision threshold indicates that a clock signal of a modulation device or a demodulation device on the communications link has a low precision or a phase error.

Optionally, the processor 1502 is specifically configured to: determine, for each of the error signals, a second angle between the error signal and a corresponding decision signal; generate an average value of all the determined second angles after averaging or weighted averaging is performed on all the second angles; and use the average value as the third statistical value; where that the third statistical value is greater than a second perpendicular decision threshold indicates that a clock signal of a modulation device or a demodulation device on the communications link has a low precision or a phase error.

Optionally, the processor 1502 is specifically configured to: determine a first correlation between an error-signal real-part sequence formed by real parts of all the error signals and a received-signal real-part sequence formed by real parts of all the received signals; determine a second correlation between an error-signal imaginary-part sequence formed by imaginary parts of all the error signals and a received-signal imaginary-part sequence formed by imaginary parts of all the received signals; and use the first correlation and the second correlation as the second statistical value; where that an absolute value of at least one of the first correlation or the second correlation is greater than a first joint correlation threshold and that the first correlation and the second correlation are opposite in terms of sign indicate that carrier signals I and Q on the communications link are amplitude-imbalanced.

Optionally, the processor 1502 is specifically configured to: determine a third correlation between an error-signal real-part sequence formed by real parts of all the error signals and a decision-signal real-part sequence formed by real parts of all the decision signals; determine a fourth correlation between an error-signal imaginary-part sequence formed by imaginary parts of all the error signals and a decision-signal imaginary-part sequence formed by imaginary parts of all the decision signals; and use the third correlation and the fourth correlation as the third statistical value; where that an absolute value of at least one of the third correlation or the fourth correlation is greater than a second joint correlation threshold and that the third correlation and the fourth correlation are opposite in terms of sign indicate that carrier signals I and Q on the communications link are amplitude-imbalanced.

Optionally, the processor 1502 is specifically configured to: determine a fifth correlation between an error-signal real-part sequence formed by real parts of all the error signals and a received-signal real-part sequence formed by real parts of all the received signals; determine a sixth correlation between an error-signal imaginary-part sequence formed by imaginary parts of all the error signals and a received-signal imaginary-part sequence formed by imaginary parts of all the received signals; and use the fifth correlation and the sixth correlation as the second statistical value; where that both the fifth correlation and the sixth correlation are less than a third joint correlation threshold indicates that a gain compression fault occurs on the communications link, where the third joint correlation threshold is less than zero.

Optionally, the processor 1502 is specifically configured to: determine a seventh correlation between an error-signal real-part sequence formed by real parts of all the error signals and a decision-signal real-part sequence formed by real parts of all the decision signals; determine an eighth correlation between an error-signal imaginary-part sequence formed by imaginary parts of all the error signals and a decision-signal imaginary-part sequence formed by imaginary parts of all the decision signals; and use the seventh correlation and the eighth correlation as the third statistical value; where that both the seventh correlation and the eighth correlation are less than a fourth joint correlation threshold indicates that a gain compression fault occurs on the communications link, where the fourth joint correlation threshold is less than zero.

Optionally, the processor 1502 is specifically configured to: determine a ninth correlation between an error-signal real-part sequence formed by real parts of all the error signals and a received-signal imaginary-part sequence formed by imaginary parts of all the received signals; and use the ninth correlation or an absolute value of the ninth correlation as the second statistical value; where that the absolute value of the ninth correlation is greater than a first orthogonal correlation threshold indicates that carrier signals I and Q on the communications link are not orthogonal; or the processor 1502 is specifically configured to: determine a tenth correlation between an error-signal imaginary-part sequence formed by imaginary parts of all the error signals and a received-signal real-part sequence formed by real parts of all the received signals; and use the tenth correlation or an absolute value of the tenth correlation as the second statistical value; where that the absolute value of the tenth correlation is greater than a second orthogonal correlation threshold indicates that carrier signals I and Q on the communications link are not orthogonal.

Optionally, the processor 1502 is specifically configured to: determine an eleventh correlation between an error-signal real-part sequence formed by real parts of all the error signals and a decision-signal imaginary-part sequence formed by imaginary parts of all the decision signals; and use the eleventh correlation or an absolute value of the eleventh correlation as the third statistical value; where that the absolute value of the eleventh correlation is greater than a third orthogonal correlation threshold indicates that carrier signals I and Q on the communications link are not orthogonal; or the processor 1502 is specifically configured to: determine a twelfth correlation between an error-signal imaginary-part sequence formed by imaginary parts of all the error signals and a decision-signal real-part sequence formed by real parts of all the decision signals; and use the twelfth correlation or an absolute value of the twelfth correlation as the third statistical value; where that the absolute value of the twelfth correlation is greater than a fourth orthogonal correlation threshold indicates that carrier signals I and Q on the communications link are not orthogonal.

Optionally, the I/O interface 1501 is specifically configured to:

separately receive signals on some channels or some subcarriers of the communications link at a same moment; or separately receive signals on all channels or all subcarriers of the communications link at a same moment; or receive signals existing at different moments on one channel or one subcarrier of the communications link; or receive signals existing at different moments on some channels or some subcarriers of the communications link; or receive signals existing at different moments on all channels or all subcarriers of the communications link.

Optionally, the I/O interface 1501 is specifically configured to:

receive, over the communications link, multiple signals that meet a set condition.

Optionally, the set condition includes:

an amplitude of the received signal is greater than a first signal selection amplitude threshold; or an absolute value of a real part of the received signal is greater than a first signal selection real-part absolute-value threshold; or an absolute value of an imaginary part of the received signal is greater than a first signal selection imaginary-part absolute-value threshold; or an amplitude of the received signal is not greater than a second signal selection amplitude threshold; or an absolute value of a real part of the received signal is not greater than a second signal selection real-part absolute-value threshold; or an absolute value of an imaginary part of the received signal is not greater than a second signal selection imaginary-part absolute-value threshold.

Figure 16:
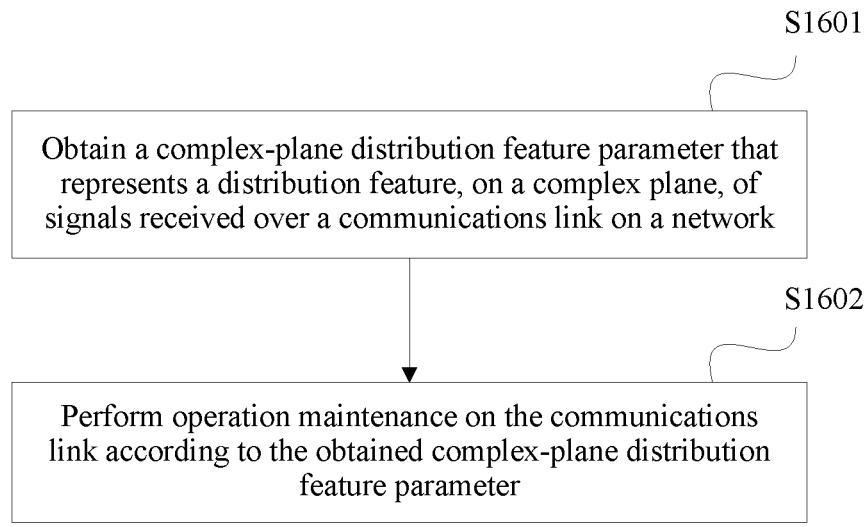
FIG. 16 is a flowchart of a network maintenance method according to an embodiment of the present invention.

FIG. 16 is a flowchart of a network maintenance method according to an embodiment of the present invention. As shown in FIG. 16, the method includes the following steps:

S1601. Obtain a complex-plane distribution feature parameter that indicates a distribution feature, on a complex plane, of signals received over a communications link on a network.

S1602. Perform maintenance on the communications link according to the obtained complex-plane distribution feature parameter.

The complex-plane distribution feature parameter is determined according to error signals between multiple signals received over the communications link and decision signals corresponding to all the received signals, and each of the received signal is corresponding to a point on the complex plane.

Optionally, the complex-plane distribution feature parameter includes:

a first statistical value obtained by collecting statistics about amplitudes, real parts, or imaginary parts of all the error signals.

Optionally, the first statistical value is:

a modulo of an average error signal obtained by averaging all the error signals, or an absolute value of a real part or an imaginary part of an average error signal; and the performing maintenance on the communications link includes:

when one or more of the following conditions are met, determining that carrier signals I and Q of a modulation or demodulation device on the communications link are coupled to a line:

the modulo of the average error signal is greater than a modulo threshold of the average error signal;

the absolute value of the real part of the average error signal is greater than an absolute-value threshold of the real part of the average error signal; or the absolute value of the imaginary part of the average error signal is greater than an absolute-value threshold of the imaginary part of the average error signal.

Optionally, the first statistical value is:

a ratio of a quantity of error signals whose amplitudes are less than an error amplitude threshold in all the error signals to a total quantity of error signals; and the performing maintenance on the communications link includes:

if the ratio of the quantity of error signals whose amplitudes are less than the error amplitude threshold in all the error signals to the total quantity of error signals is less than an error-center distribution ratio threshold, determining that a carrier on the communications link is interfered with.

Optionally, the complex-plane distribution feature parameter includes:

a second statistical value used to indicate a relationship between all the error signals and their respective received signals; or a third statistical value used to indicate a relationship between all the error signals and their respective decision signals.

Optionally, the second statistical value is generated by performing the following steps:

determining, for each of the error signals, a first angle between the error signal and a corresponding received signal; generating an average value of all the determined first angles after averaging or weighted averaging is performed on all the first angles; and using the average value as the second statistical value; and the performing maintenance on the communications link includes:

if the second statistical value is greater than a first perpendicular decision threshold, determining that a clock signal of a modulation device or a demodulation device on the communications link has a low precision or a phase error.

Optionally, the third statistical value is generated by performing the following steps:

determining, for each of the error signals, a second angle between the error signal and a corresponding decision signal; generating an average value of all the determined second angles after averaging or weighted averaging is performed on all the second angles; and using the average value as the third statistical value; and the performing maintenance on the communications link includes:

if the third statistical value is greater than a second perpendicular decision threshold, determining that a clock signal of a modulation device or a demodulation device on the communications link has a low precision or a phase error.

Optionally, the second statistical value is generated by performing the following steps:

determining a first correlation between an error-signal real-part sequence formed by real parts of all the error signals and a received-signal real-part sequence formed by real parts of all the received signals;

determining a second correlation between an error-signal imaginary-part sequence formed by imaginary parts of all the error signals and a received-signal imaginary-part sequence formed by imaginary parts of all the received signals; and using the first correlation and the second correlation as the second statistical value; and the performing maintenance on the communications link includes:

if an absolute value of at least one of the first correlation or the second correlation is greater than a first joint correlation threshold, and the first correlation and the second correlation are opposite in terms of sign, determining that carrier signals I and Q on the communications link are amplitude-imbalanced.

Optionally, the third statistical value is generated by performing the following steps:

determining a third correlation between an error-signal real-part sequence formed by real parts of all the error signals and a decision-signal real-part sequence formed by real parts of all the decision signals;

determining a fourth correlation between an error-signal imaginary-part sequence formed by imaginary parts of all the error signals and a decision-signal imaginary-part sequence formed by imaginary parts of all the decision signals; and using the third correlation and the fourth correlation as the third statistical value; and the performing maintenance on the communications link includes:

if an absolute value of at least one of the third correlation or the fourth correlation is greater than a second joint correlation threshold, and the third correlation and the fourth correlation are opposite in terms of sign, determining that carrier signals I and Q on the communications link are amplitude-imbalanced.

Optionally, the second statistical value is generated by performing the following steps:

determining a fifth correlation between an error-signal real-part sequence formed by real parts of all the error signals and a received-signal real-part sequence formed by real parts of all the received signals;

determining a sixth correlation between an error-signal imaginary-part sequence formed by imaginary parts of all the error signals and a received-signal imaginary-part sequence formed by imaginary parts of all the received signals; and using the fifth correlation and the sixth correlation as the second statistical value; and the performing maintenance on the communications link includes:

if both the fifth correlation and the sixth correlation are less than a third joint correlation threshold, determining that a gain compression fault occurs on the communications link, where the third joint correlation threshold is less than zero.

Optionally, the third statistical value is generated by performing the following steps:

determining a seventh correlation between an error-signal real-part sequence formed by real parts of all the error signals and a decision-signal real-part sequence formed by real parts of all the decision signals;

determining an eighth correlation between an error-signal imaginary-part sequence formed by imaginary parts of all the error signals and a decision-signal imaginary-part sequence formed by imaginary parts of all the decision signals; and using the seventh correlation and the eighth correlation as the third statistical value; and the performing maintenance on the communications link includes:

if both the seventh correlation and the eighth correlation are less than a fourth joint correlation threshold, determining that a gain compression fault occurs on the communications link, where the fourth joint correlation threshold is less than zero.

Optionally, the second statistical value is generated by performing the following steps: determining a ninth correlation between an error-signal real-part sequence formed by real parts of all the error signals and a received-signal imaginary-part sequence formed by imaginary parts of all the received signals; and using the ninth correlation or an absolute value of the ninth correlation as the second statistical value; and the performing maintenance on the communications link includes: if the absolute value of the ninth correlation is greater than a first orthogonal correlation threshold, determining that carrier signals I and Q on the communications link are not orthogonal; or the second statistical value is generated by performing the following steps: determining a tenth correlation between an error-signal imaginary-part sequence formed by imaginary parts of all the error signals and a received-signal real-part sequence formed by real parts of all the received signals; and using the tenth correlation or an absolute value of the tenth correlation as the second statistical value; and the performing maintenance on the communications link includes: if the absolute value of the tenth correlation is greater than a second orthogonal correlation threshold, determining that carrier signals I and Q on the communications link are not orthogonal.

Optionally, the third statistical value is generated by performing the following steps: determining an eleventh correlation between an error-signal real-part sequence formed by real parts of all the error signals and a decision-signal imaginary-part sequence formed by imaginary parts of all the decision signals; and using the eleventh correlation or an absolute value of the eleventh correlation as the third statistical value; and the performing maintenance on the communications link includes: if the absolute value of the eleventh correlation is greater than a third orthogonal correlation threshold, determining that carrier signals I and Q on the communications link are not orthogonal; or the third statistical value is generated by performing the following steps: determining a twelfth correlation between an error-signal imaginary-part sequence formed by imaginary parts of all the error signals and a decision-signal real-part sequence formed by real parts of all the decision signals; and using the twelfth correlation or an absolute value of the twelfth correlation as the third statistical value; and the performing maintenance on the communications link includes: if the absolute value of the twelfth correlation is greater than a fourth orthogonal correlation threshold, determining that carrier signals I and Q on the communications link are not orthogonal.

Figure 17:
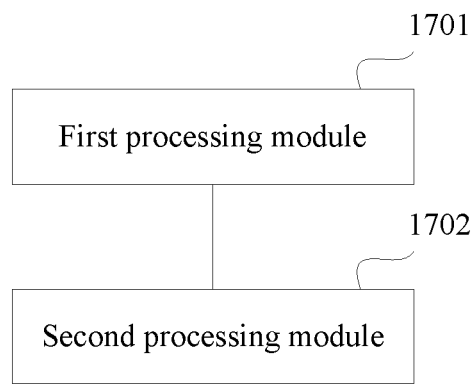
FIG. 17 is a schematic structural diagram of a first network maintenance apparatus according to an embodiment of the present invention.

FIG. 17 is a schematic structural diagram of a first network maintenance apparatus according to an embodiment of the present invention. As shown in FIG. 17, the apparatus includes:

a first processing module 1701, configured to obtain a complex-plane distribution feature parameter that indicates a distribution feature, on a complex plane, of signals received over a communications link on a network; and a second processing module 1702, configured to perform maintenance on the communications link according to the complex-plane distribution feature parameter obtained by the first processing module 1701.

The complex-plane distribution feature parameter is determined according to error signals between multiple signals received over the communications link and decision signals corresponding to all the received signals, and each of the received signal is corresponding to a point on the complex plane.

Optionally, the complex-plane distribution feature parameter includes:

a first statistical value obtained by collecting statistics about amplitudes, real parts, or imaginary parts of all the error signals.

Optionally, the first statistical value is a modulo of an average error signal obtained by averaging all the error signals, or an absolute value of a real part or an imaginary part of an average error signal; and the second processing module 1702 is specifically configured to: when one or more of the following conditions are met, determine that carrier signals I and Q of a modulation or demodulation device on the communications link are coupled to a line:

the modulo of the average error signal is greater than a modulo threshold of the average error signal;

the absolute value of the real part of the average error signal is greater than an absolute-value threshold of the real part of the average error signal; or the absolute value of the imaginary part of the average error signal is greater than an absolute-value threshold of the imaginary part of the average error signal.

Optionally, the first statistical value is a ratio of a quantity of error signals whose amplitudes are less than an error amplitude threshold in all the error signals to a total quantity of error signals; and the second processing module 1702 is specifically configured to: if the ratio of the quantity of error signals whose amplitudes are less than the error amplitude threshold in all the error signals to the total quantity of error signals is less than an error-center distribution ratio threshold, determine that a carrier on the communications link is interfered with.

Optionally, the complex-plane distribution feature parameter includes:

a second statistical value used to indicate a relationship between all the error signals and their respective received signals; or a third statistical value used to indicate a relationship between all the error signals and their respective decision signals.

Optionally, the second statistical value is generated by performing the following steps: determining, for each of the error signals, a first angle between the error signal and a corresponding received signal; generating an average value of all the determined first angles after averaging or weighted averaging is performed on all the first angles; and using the average value as the second statistical value; and the second processing module 1702 is specifically configured to: if the second statistical value is greater than a first perpendicular decision threshold, determine that a clock signal of a modulation device or a demodulation device on the communications link has a low precision or a phase error.

Optionally, the third statistical value is generated by performing the following steps: determining, for each of the error signals, a second angle between the error signal and a corresponding decision signal; generating an average value of all the determined second angles after averaging or weighted averaging is performed on all the second angles; and using the average value as the third statistical value; and the second processing module 1702 is specifically configured to: if the third statistical value is greater than a second perpendicular decision threshold, determine that a clock signal of a modulation device or a demodulation device on the communications link has a low precision or a phase error.

Optionally, the second statistical value is generated by performing the following steps: determining a first correlation between an error-signal real-part sequence formed by real parts of all the error signals and a received-signal real-part sequence formed by real parts of all the received signals; determining a second correlation between an error-signal imaginary-part sequence formed by imaginary parts of all the error signals and a received-signal imaginary-part sequence formed by imaginary parts of all the received signals; and using the first correlation and the second correlation as the second statistical value; and the second processing module 1702 is specifically configured to: if an absolute value of at least one of the first correlation or the second correlation is greater than a first joint correlation threshold, and the first correlation and the second correlation are opposite in terms of sign, determine that carrier signals I and Q on the communications link are amplitude-imbalanced.

Optionally, the third statistical value is generated by performing the following steps: determining a third correlation between an error-signal real-part sequence formed by real parts of all the error signals and a decision-signal real-part sequence formed by real parts of all the decision signals; determining a fourth correlation between an error-signal imaginary-part sequence formed by imaginary parts of all the error signals and a decision-signal imaginary-part sequence formed by imaginary parts of all the decision signals; and using the third correlation and the fourth correlation as the third statistical value; and the second processing module 1702 is specifically configured to: if an absolute value of at least one of the third correlation or the fourth correlation is greater than a second joint correlation threshold, and the third correlation and the fourth correlation are opposite in terms of sign, determine that carrier signals I and Q on the communications link are amplitude-imbalanced.

Optionally, the second statistical value is generated by performing the following steps: determining a fifth correlation between an error-signal real-part sequence formed by real parts of all the error signals and a received-signal real-part sequence formed by real parts of all the received signals; determining a sixth correlation between an error-signal imaginary-part sequence formed by imaginary parts of all the error signals and a received-signal imaginary-part sequence formed by imaginary parts of all the received signals; and using the fifth correlation and the sixth correlation as the second statistical value; and the second processing module 1702 is specifically configured to: if both the fifth correlation and the sixth correlation are less than a third joint correlation threshold, determine that a gain compression fault occurs on the communications link, where the third joint correlation threshold is less than zero.

Optionally, the third statistical value is generated by performing the following steps: determining a seventh correlation between an error-signal real-part sequence formed by real parts of all the error signals and a decision-signal real-part sequence formed by real parts of all the decision signals; determining an eighth correlation between an error-signal imaginary-part sequence formed by imaginary parts of all the error signals and a decision-signal imaginary-part sequence formed by imaginary parts of all the decision signals; and using the seventh correlation and the eighth correlation as the third statistical value; and the second processing module 1702 is specifically configured to: if both the seventh correlation and the eighth correlation are less than a fourth joint correlation threshold, determine that a gain compression fault occurs on the communications link, where the fourth joint correlation threshold is less than zero.

Optionally, the second statistical value is generated by performing the following steps: determining a ninth correlation between an error-signal real-part sequence formed by real parts of all the error signals and a received-signal imaginary-part sequence formed by imaginary parts of all the received signals; and using the ninth correlation or an absolute value of the ninth correlation as the second statistical value; and the second processing module 1702 is specifically configured to: if the absolute value of the ninth correlation is greater than a first orthogonal correlation threshold, determine that carrier signals I and Q on the communications link are not orthogonal; or the second statistical value is generated by performing the following steps: determining a tenth correlation between an error-signal imaginary-part sequence formed by imaginary parts of all the error signals and a received-signal real-part sequence formed by real parts of all the received signals; and using the tenth correlation or an absolute value of the tenth correlation as the second statistical value; and the second processing module 1702 is specifically configured to: if the absolute value of the tenth correlation is greater than a second orthogonal correlation threshold, determine that carrier signals I and Q on the communications link are not orthogonal.

Optionally, the third statistical value is generated by performing the following steps: determining an eleventh correlation between an error-signal real-part sequence formed by real parts of all the error signals and a decision-signal imaginary-part sequence formed by imaginary parts of all the decision signals; and using the eleventh correlation or an absolute value of the eleventh correlation as the third statistical value; and the second processing module 1702 is specifically configured to: if the absolute value of the eleventh correlation is greater than a third orthogonal correlation threshold, determine that carrier signals I and Q on the communications link are not orthogonal; or the third statistical value is generated by performing the following steps: determining a twelfth correlation between an error-signal imaginary-part sequence formed by imaginary parts of all the error signals and a decision-signal real-part sequence formed by real parts of all the decision signals; and using the twelfth correlation or an absolute value of the twelfth correlation as the third statistical value; and the second processing module 1702 is specifically configured to: if the absolute value of the twelfth correlation is greater than a fourth orthogonal correlation threshold, determine that carrier signals I and Q on the communications link are not orthogonal.

Figure 18:
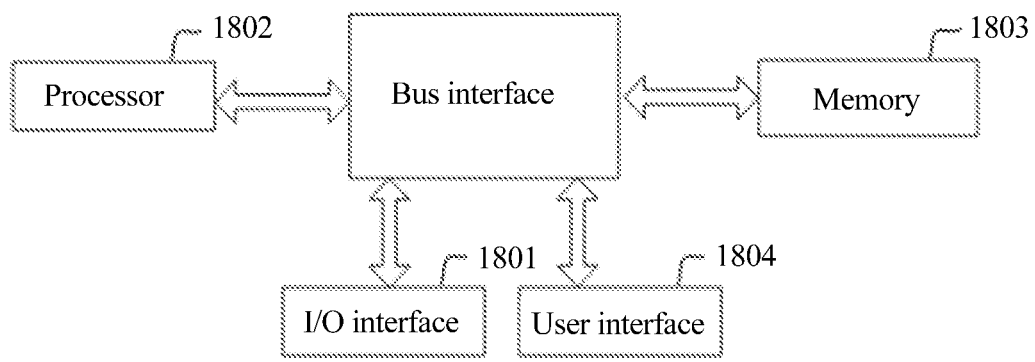
FIG. 18 is a schematic structural diagram of a second network maintenance apparatus according to an embodiment of the present invention.

FIG. 18 is a schematic structural diagram of a second network maintenance apparatus according to an embodiment of the present invention. As shown in FIG. 18, the apparatus includes:

an I/O interface 1801, configured to obtain a complex-plane distribution feature parameter that indicates a distribution feature, on a complex plane, of signals received over a communications link on a network; and a processor 1802, configured to perform maintenance on the communications link according to the complex-plane distribution feature parameter obtained by the I/O interface 1801.

The complex-plane distribution feature parameter is determined according to error signals between multiple signals received over the communications link and decision signals corresponding to all the received signals, and each of the received signal is corresponding to a point on the complex plane.

Optionally, the complex-plane distribution feature parameter includes:

a first statistical value obtained by collecting statistics about amplitudes, real parts; or imaginary parts of all the error signals.

Optionally, the first statistical value is a modulo of an average error signal obtained by averaging all the error signals, or an absolute value of a real part or an imaginary part of an average error signal; and the processor 1802 is specifically configured to: when one or more of the following conditions are met, determine that carrier signals I and Q of a modulation or demodulation device on the communications link are coupled to a line:

the modulo of the average error signal is greater than a modulo threshold of the average error signal;

the absolute value of the real part of the average error signal is greater than an absolute-value threshold of the real part of the average error signal; or the absolute value of the imaginary part of the average error signal is greater than an absolute-value threshold of the imaginary part of the average error signal.

Optionally, the first statistical value is a ratio of a quantity of error signals whose amplitudes are less than an error amplitude threshold in all the error signals to a total quantity of error signals; and the processor 1802 is specifically configured to: if the ratio of the quantity of error signals whose amplitudes are less than the error amplitude threshold in all the error signals to the total quantity of error signals is less than an error-center distribution ratio threshold, determine that a carrier on the communications link is interfered with.

Optionally, the complex-plane distribution feature parameter includes:

a second statistical value used to indicate a relationship between all the error signals and their respective received signals; or a third statistical value used to indicate a relationship between all the error signals and their respective decision signals.

Optionally, the second statistical value is generated by performing the following steps: determining, for each of the error signals, a first angle between the error signal and a corresponding received signal; generating an average value of all the determined first angles after averaging or weighted averaging is performed on all the first angles; and using the average value as the second statistical value; and the processor 1802 is specifically configured to: if the second statistical value is greater than a first perpendicular decision threshold, determine that a clock signal of a modulation device or a demodulation device on the communications link has a low precision or a phase error.

Optionally, the third statistical value is generated by performing the following steps: determining, for each of the error signals, a second angle between the error signal and a corresponding decision signal; generating an average value of all the determined second angles after averaging or weighted averaging is performed on all the second angles; and using the average value as the third statistical value; and the processor 1802 is specifically configured to: if the third statistical value is greater than a second perpendicular decision threshold, determine that a clock signal of a modulation device or a demodulation device on the communications link has a low precision or a phase error.

Optionally, the second statistical value is generated by performing the following steps: determining a first correlation between an error-signal real-part sequence formed by real parts of all the error signals and a received-signal real-part sequence formed by real parts of all the received signals; determining a second correlation between an error-signal imaginary-part sequence formed by imaginary parts of all the error signals and a received-signal imaginary-part sequence formed by imaginary parts of all the received signals; and using the first correlation and the second correlation as the second statistical value; and the processor 1802 is specifically configured to: if an absolute value of at least one of the first correlation or the second correlation is greater than a first joint correlation threshold, and the first correlation and the second correlation are opposite in terms of sign, determine that carrier signals I and Q on the communications link are amplitude-imbalanced.

Optionally, the third statistical value is generated by performing the following steps: determining a third correlation between an error-signal real-part sequence formed by real parts of all the error signals and a decision-signal real-part sequence formed by real parts of all the decision signals; determining a fourth correlation between an error-signal imaginary-part sequence formed by imaginary parts of all the error signals and a decision-signal imaginary-part sequence formed by imaginary parts of all the decision signals; and using the third correlation and the fourth correlation as the third statistical value; and the processor 1802 is specifically configured to: if an absolute value of at least one of the third correlation or the fourth correlation is greater than a second joint correlation threshold, and the third correlation and the fourth correlation are opposite in terms of sign, determine that carrier signals I and Q on the communications link are amplitude-imbalanced.

Optionally, the second statistical value is generated by performing the following steps: determining a fifth correlation between an error-signal real-part sequence formed by real parts of all the error signals and a received-signal real-part sequence formed by real parts of all the received signals; determining a sixth correlation between an error-signal imaginary-part sequence formed by imaginary parts of all the error signals and a received-signal imaginary-part sequence formed by imaginary parts of all the received signals; and using the fifth correlation and the sixth correlation as the second statistical value; and the processor 1802 is specifically configured to: if both the fifth correlation and the sixth correlation are less than a third joint correlation threshold; determine that a gain compression fault occurs on the communications link, where the third joint correlation threshold is less than zero.

Optionally, the third statistical value is generated by performing the following steps: determining a seventh correlation between an error-signal real-part sequence formed by real parts of all the error signals and a decision-signal real-part sequence formed by real parts of all the decision signals; determining an eighth correlation between an error-signal imaginary-part sequence formed by imaginary parts of all the error signals and a decision-signal imaginary-part sequence formed by imaginary parts of all the decision signals; and using the seventh correlation and the eighth correlation as the third statistical value; and the processor 1802 is specifically configured to: if both the seventh correlation and the eighth correlation are less than a fourth joint correlation threshold, determine that a gain compression fault occurs on the communications link, where the fourth joint correlation threshold is less than zero.

Optionally, the second statistical value is generated by performing the following steps: determining a ninth correlation between an error-signal real-part sequence formed by real parts of all the error signals and a received-signal imaginary-part sequence formed by imaginary parts of all the received signals; and using the ninth correlation or an absolute value of the ninth correlation as the second statistical value; and the processor 1802 is specifically configured to: if the absolute value of the ninth correlation is greater than a first orthogonal correlation threshold, determine that carrier signals I and Q on the communications link are not orthogonal; or the second statistical value is generated by performing the following steps: determining a tenth correlation between an error-signal imaginary-part sequence formed by imaginary parts of all the error signals and a received-signal real-part sequence formed by real parts of all the received signals; and using the tenth correlation or an absolute value of the tenth correlation as the second statistical value; and the processor 1802 is specifically configured to: if the absolute value of the tenth correlation is greater than a second orthogonal correlation threshold, determine that carrier signals I and Q on the communications link are not orthogonal.

Optionally, the third statistical value is generated by performing the following steps: determining an eleventh correlation between an error-signal real-part sequence formed by real parts of all the error signals and a decision-signal imaginary-part sequence formed by imaginary parts of all the decision signals; and using the eleventh correlation or an absolute value of the eleventh correlation as the third statistical value; and the processor 1802 is specifically configured to: if the absolute value of the eleventh correlation is greater than a third orthogonal correlation threshold, determine that carrier signals I and Q on the communications link are not orthogonal; or the third statistical value is generated by performing the following steps: determining a twelfth correlation between an error-signal imaginary-part sequence formed by imaginary parts of all the error signals and a decision-signal real-part sequence formed by real parts of all the decision signals; and using the twelfth correlation or an absolute value of the twelfth correlation as the third statistical value; and the processor 1802 is specifically configured to: if the absolute value of the twelfth correlation is greater than a fourth orthogonal correlation threshold, determine that carrier signals I and Q on the communications link are not orthogonal.

Figure 19:
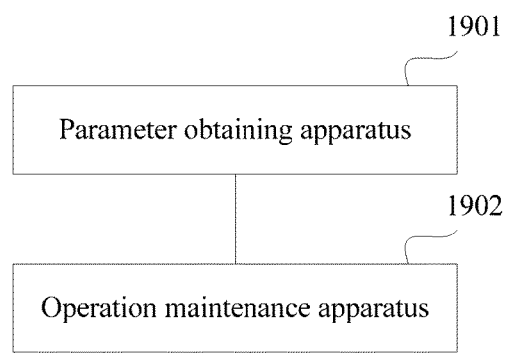
FIG. 19 is a schematic structural diagram of a network maintenance system according to an embodiment of the present invention.

FIG. 19 is a schematic structural diagram of a network maintenance system according to an embodiment of the present invention. As shown in FIG. 19, the system includes:

a parameter obtaining apparatus 1901 and an maintenance apparatus 1902, where:

the parameter obtaining apparatus 1901 is configured to: receive multiple signals over a communications link on a network, where each of the received signals is corresponding to a point on a complex plane; perform decision on each of the received signals, so as to obtain a decision signal; determine, for each of the received signals, an error signal between the received signal and a corresponding decision signal; determine, according to all the determined error signals, a complex-plane distribution feature parameter used to indicate a distribution feature, on the complex plane, of the signals received over the communications link; and send the determined complex-plane distribution feature parameter to the maintenance apparatus 1902; and the maintenance apparatus 1902 is configured to perform maintenance on the communications link according to the complex-plane distribution feature parameter sent by the parameter obtaining apparatus 1901.

For a definition of the complex-plane distribution feature parameter, a communications link fault that can be indicated, and optionally, a solution of performing maintenance on the communications link by the system, which are all involved in the network maintenance system provided in this embodiment of the present invention, refer to the parameter obtaining method provided in the embodiments of the present invention.

Optionally, the parameter obtaining apparatus 1901 and the maintenance apparatus 1902 are located on a same device or different devices on the network.

A possible situation is that the network is a hybrid fiber coaxial HFC network.

In this case, if the parameter obtaining apparatus 1901 and the maintenance apparatus 1902 are located on a same device on the network, the parameter obtaining apparatus 1901 and the maintenance apparatus 1902 may be located on a CMTS, a CM, or a PNM server.

If the parameter obtaining apparatus 1901 and the maintenance apparatus 1902 are located on different devices on the network, the parameter obtaining apparatus 1901 may be located on a CMTS or a CM on the network, and the maintenance apparatus 1902 may be located on a PNM server on the network.

Optionally, the parameter obtaining apparatus 1901 can send the determined complex-plane distribution feature parameter to the maintenance apparatus 1902 by using a Simple Network Management Protocol (SNMP).

In addition, if the network uses an OFDM modulation scheme, a channel is divided, in a frequency domain, into multiple subcarriers. For example, in a DOCSIS 3.1 system, a channel may be divided into 8192 subcarriers.

Optionally, for example, for a multi-carrier network that uses the OFDM modulation scheme, a corresponding complex-plane distribution feature parameter is obtained for each carrier. In this case, the complex-plane distribution feature parameters for the multiple carriers can be stored or transmitted by using an array. For example, for a network that uses the OFDM modulation scheme, sequence numbers of subcarriers on which maintenance needs to be performed are $C1, C2, \ldots, CK$, where K is a positive integer. For each subcarrier, a signal is received, and a complex-plane distribution feature parameter is determined.

When the complex-plane distribution feature parameter is stored and transmitted, for example, for the complex-plane distribution feature parameter-correlation between an error and a signal, a correlation corr–I, on subcarriers C1~CK, between an error and a signal can be indicated by using an array corr–I($C1, C2, \ldots, CK$).

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A parameter obtaining method, wherein the method comprises:
    receiving multiple signals over a communications link on a network, wherein each of the received signals is corresponding to a point on a complex plane;
    performing decision on each of the received signals, so as to obtain a decision signal;
    determining, for each of the received signals, an error signal between the received signal and a corresponding decision signal; and
    determining, according to all the determined error signals, a complex-plane distribution feature parameter used to indicate a distribution feature, on the complex plane, of the signals received over the communications link, wherein the determining a complex-plane distribution feature parameter comprises:
    collecting statistics about amplitudes, real parts, or imaginary parts of all the error signals, so as to generate a first statistical value; and
    using the generated first statistical value as the complex-plane distribution feature parameter, wherein the determining a complex-plane distribution feature parameter further comprises:
    determining a second statistical value used to indicate a relationship between all the error signals and their respective received signals, and using the second statistical value as the complex-plane distribution feature parameter; or
    determining a third statistical value used to indicate a relationship between all the error signals and their respective decision signals, and using the third statistical value as the complex-plane distribution feature parameter.

2. A parameter obtaining method, wherein the method comprises:
    receiving multiple signals over a communications link on a network, wherein each of the received signals is corresponding to a point on a complex plane;
    performing decision on each of the received signals, so as to obtain a decision signal;
    determining, for each of the received signals, an error signal between the received signal and a corresponding decision signal; and
    determining according to all the determined error signals, a complex-plane distribution feature parameter used to indicate a distribution feature, on the complex plane, of the signals received over the communications link, wherein
    the determining a complex-plane distribution feature parameter comprises:
    collecting statistics about amplitudes, real parts, or imaginary parts of all the error signals, so as to generate a first statistical value; and
    using the generated first statistical value as the complex-plane distribution feature parameter, wherein:
    the generating a first statistical value comprises: averaging all the error signals, so as to obtain an average error signal; obtaining a modulo of the average error signal, or obtaining an absolute value of a real part or an imaginary part of the average error signal; and using the modulo or the absolute value as the first statistical value; wherein
    that the first statistical value meets one or more of the following conditions indicates that carrier signals I and Q of a modulation or demodulation device on the communications link are coupled to a line:
    the modulo of the average error signal is greater than a modulo threshold of the average error signal;
    the absolute value of the real part of the average error signal is greater than an absolute-value threshold of the real part of the average error signal; or
    the absolute value of the imaginary part of the average error signal is greater than an absolute-value threshold of the imaginary part of the average error signal.

3. The method according to claim 1, wherein:
    the generating a first statistical value comprises: using, as the first statistical value, a ratio of a quantity of error signals whose amplitudes are less than an error amplitude threshold in all the error signals to a total quantity of error signals; wherein
    that the first statistical value meets the following condition indicates that a carrier on the communications link is interfered with:
    the ratio of the quantity of error signals whose amplitudes are less than the error amplitude threshold in all the error signals to the total quantity of error signals is less than an error-center distribution ratio threshold.

4. The method according to claim 1, wherein:
    the determining a second statistical value comprises: determining, for each of the error signals, a first angle between the error signal and a corresponding received signal; generating an average value of all the determined first angles after averaging or weighted averaging is performed on all the first angles; and using the average value as the second statistical value; wherein
    that the second statistical value is greater than a first perpendicular decision threshold indicates that a clock signal of a modulation device or a demodulation device on the communications link has a low precision or a phase error.

5. The method according to claim 1, wherein:

the determining a third statistical value comprises: determining, for each of the error signals, a second angle between the error signal and a corresponding decision signal; generating an average value of all the determined second angles after averaging or weighted averaging is performed on all the second angles; and using the average value as the third statistical value; wherein that the third statistical value is greater than a second perpendicular decision threshold indicates that a clock signal of a modulation device or a demodulation device on the communications link has a low precision or a phase error.

6. The method according to claim 1, wherein:

the determining a second statistical value comprises: determining a first correlation between an error-signal real-part sequence formed by real parts of all the error signals and a received-signal real-part sequence formed by real parts of all the received signals; determining a second correlation between an error-signal imaginary-part sequence formed by imaginary parts of all the error signals and a received-signal imaginary-part sequence formed by imaginary parts of all the received signals; and using the first correlation and the second correlation as the second statistical value; wherein that an absolute value of at least one of the first correlation or the second correlation is greater than a first joint correlation threshold and that the first correlation and the second correlation are opposite in terms of sign indicate that carrier signals I and Q on the communications link are amplitude-imbalanced.

7. The method according to claim 1, wherein:

the determining a third statistical value comprises: determining a third correlation between an error-signal real-part sequence formed by real parts of all the error signals and a decision-signal real-part sequence formed by real parts of all the decision signals; determining a fourth correlation between an error-signal imaginary-part sequence formed by imaginary parts of all the error signals and a decision-signal imaginary-part sequence formed by imaginary parts of all the decision signals; and using the third correlation and the fourth correlation as the third statistical value; wherein that an absolute value of at least one of the third correlation or the fourth correlation is greater than a second joint correlation threshold and that the third correlation and the fourth correlation are opposite in terms of sign indicate that carrier signals I and Q on the communications link are amplitude-imbalanced.

8. The method according to claim 1, wherein the receiving multiple signals over a communications link comprises:

separately receiving signals on some channels or some subcarriers of the communications link at a same moment; or separately receiving signals on all channels or all subcarriers of the communications link at a same moment; or receiving signals existing at different moments on one channel or one subcarrier of the communications link; or receiving signals existing at different moments on some channels or some subcarriers of the communications link; or receiving signals existing at different moments on all channels or all subcarriers of the communications link.

9. The method according to claim 1, wherein the set condition comprises:

an amplitude of the received signal is greater than a first signal selection amplitude threshold; or an absolute value of a real part of the received signal is greater than a first signal selection real-part absolute-value threshold; or an absolute value of an imaginary part of the received signal is greater than a first signal selection imaginary-part absolute-value threshold; or an amplitude of the received signal is not greater than a second signal selection amplitude threshold; or an absolute value of a real part of the received signal is not greater than a second signal selection real-part absolute-value threshold; or an absolute value of an imaginary part of the received signal is not greater than a second signal selection imaginary-part absolute-value threshold.

10. A parameter obtaining apparatus, whereon the apparatus comprises: a non-transitory memory storing instructions: and a processor in communication with the non-transitory memory to execute the instructions to configure the hardware processor to: receive multiple signals over a communications link on a network, wherein each of the received signals is corresponding to a point on a complex plane; perform decision on each of the received signals, so as to obtain a decision signal; and determine, for each of the received signals, an error signal between the received signal and a corresponding decision signal; and determine, according to all the error signals determined by the first processing module, a complex-plane distribution feature parameter used to indicate a distribution feature, on the complex plane, of the signals received over the communications link, comprising: collect statistics about amplitudes, real parts, or imaginary parts of all the error signals, so as to generate a first statistical value; and use the generated first statistical value as the complex-plane distribution feature parameter; or determine a second statistical value used to indicate a relationship between all the error signals and their respective received signals, and use the second statistical value as the complex-plane distribution feature parameter; or determine a third statistical value used to indicate a relationship between all the error signals and theft respective decision signals, and use the third statistical value as the complex-plane distribution feature parameter.

11. A network operation maintenance system, wherein the system comprises:

a parameter obtaining apparatus; and a maintenance apparatus, wherein:

the parameter obtaining apparatus is configured to: receive multiple signals over a communications link on a network, wherein each of the received signals is corresponding to a point on a complex plane; perform decision on each of the received signals, so as to obtain a decision signal; determine, for each of the received signals, an error signal between the received signal and a corresponding decision signal; determine, according to all the determined error signals, a complex-plane distribution feature parameter used to indicate a distribution feature, on the complex plane, of the signals received over the communications link; and send the determined complex-plane distribution feature parameter to the maintenance apparatus, wherein the determine a complex-plane distribution feature parameter comprises:

collect statistics about amplitudes, real parts, or imaginary parts of all the error signals, so as to generate a first statistical value; and use the generated first statistical value as the complex-plane distribution feature parameter;

the determine a complex-plane distribution feature parameter further comprises:

determine a second statistical value used to indicate a relationship between all the error signals and their respective received signals, and using the second statistical value as the complex-plane distribution feature parameter; or determine a third statistical value used to indicate a relationship between all the error signals and their respective decision signals, and using the third statistical value as the complex-plane distribution feature parameter; and the maintenance apparatus is configured to perform maintenance on the communications link according to the complex-plane distribution feature parameter sent by the parameter obtaining apparatus.

12. The system according to claim 11, wherein:

the network is a hybrid fiber coaxial HFC network, wherein the parameter obtaining apparatus and the maintenance apparatus are located on a cable modem termination system CMTS, a cable modem CM, or a proactive network maintenance PNM server; or the parameter obtaining apparatus is located on a CMTS or a CM on the network, and the maintenance apparatus is located on a PNM server on the network.

* * * * *

UNITED STATES PATENT AND TRADEMARK OFFICE
CERTIFICATE OF CORRECTION

PATENT NO. : 9,992,089 B2
APPLICATION NO. : 15/355203
DATED : June 5, 2018
INVENTOR(S) : Jie Lv et al.

It is certified that error appears in the above-identified patent and that said Letters Patent is hereby corrected as shown below:

In the Claims

Column 52, Line 42:
In Claim 10, delete "theft" and insert -- their --, therefore.

Signed and Sealed this
Tenth Day of July, 2018

Andrei Iancu
*Director of the United States Patent and Trademark Office*